US008896881B2

(12) United States Patent
Hitaka

(10) Patent No.: US 8,896,881 B2
(45) Date of Patent: Nov. 25, 2014

(54) IMAGING FORMING SYSTEM COMPRISED OF IMAGE FORMING APPARATUSES ARRANGED IN SERIES, AND WHICH PREVENTS AN EXCESSIVE RISE IN EITHER OF AN INSIDE TEMPERATURE OR A FIXING SECTION TEMPERATURE OF A DOWNSTREAM IMAGE FORMING APPARATUS

(75) Inventor: Masatoshi Hitaka, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 174 days.

(21) Appl. No.: 13/293,303

(22) Filed: Nov. 10, 2011

(65) Prior Publication Data

US 2012/0120422 A1 May 17, 2012

(30) Foreign Application Priority Data

Nov. 17, 2010 (JP) ................................ 2010-256368

(51) Int. Cl.
*H04N 1/60* (2006.01)
*G06F 3/12* (2006.01)
*G03G 15/20* (2006.01)
*G03B 27/52* (2006.01)
*G03G 15/23* (2006.01)

(52) U.S. Cl.
CPC ............ *G03G 15/238* (2013.01); *G03G 15/205* (2013.01); *G03G 2215/00021* (2013.01)
USPC ............. 358/1.9; 358/1.15; 358/296; 399/33; 399/309; 355/24

(58) Field of Classification Search
None
See application file for complete search history.

(56) References Cited

U.S. PATENT DOCUMENTS 6,927,875 B2 * 8/2005 Ueno et al. .................. 358/1.18
8,280,270 B2 * 10/2012 Morita ........................... 399/69

(Continued)

FOREIGN PATENT DOCUMENTS

JP 05088581 A 4/1993
JP 08-234605 A 9/1996

(Continued)

OTHER PUBLICATIONS

Japanese Office Action dated Mar. 4, 2014 (and English translation thereof) in counterpart Japanese Application No. 2010-256368.

(Continued)

*Primary Examiner* — Madelein A Nguyen
(74) *Attorney, Agent, or Firm* — Holtz, Holtz, Goodman & Chick PC

(57) ABSTRACT

An image forming system includes a first image forming apparatus and a second image forming apparatus, the first image forming apparatus including: a first image forming section which performs image formation on a sheet; a first fixing section which performs image fixation on the sheet on which the first image forming section performs the image formation; and a first control section which makes, when the first image forming apparatus and the second image forming apparatus perform the image formation and the image fixation on different sides of a sheet to perform double-sided printing, thereby performing tandem outputting, a tandem-outputting target fixing temperature of the first fixing section lower than a first fiducial temperature which is a non-tandem-outputting target fixing temperature of the first fixing section for when the first image forming performs the image formation and the image fixation alone.

18 Claims, 11 Drawing Sheets

(56) References Cited

U.S. PATENT DOCUMENTS

| | | | | |
|---|---|---|---|---|
| 2001/0017992 | A1* | 8/2001 | Hayashi et al. | 399/68 |
| 2005/0105929 | A1* | 5/2005 | Chae et al. | 399/69 |
| 2005/0271408 | A1* | 12/2005 | Hayashi | 399/70 |
| 2006/0013602 | A1* | 1/2006 | Lee et al. | 399/45 |
| 2006/0222393 | A1* | 10/2006 | de Jong et al. | 399/67 |
| 2007/0071465 | A1* | 3/2007 | Hamby et al. | 399/45 |
| 2007/0280709 | A1* | 12/2007 | Higashiuchi et al. | 399/43 |
| 2008/0226326 | A1* | 9/2008 | Seo et al. | 399/69 |
| 2009/0196644 | A1* | 8/2009 | Funatsu | 399/69 |
| 2009/0208238 | A1* | 8/2009 | Higashi et al. | 399/69 |
| 2010/0097437 | A1* | 4/2010 | Nagumo | 347/237 |
| 2011/0033197 | A1* | 2/2011 | Morita | 399/69 |
| 2011/0135325 | A1* | 6/2011 | Hitaka et al. | 399/21 |
| 2011/0219250 | A1* | 9/2011 | Hitaka et al. | 713/323 |
| 2011/0229183 | A1* | 9/2011 | Seki et al. | 399/82 |
| 2013/0063779 | A1* | 3/2013 | Mano | 358/1.15 |
| 2013/0209130 | A1* | 8/2013 | Fukuzawa et al. | 399/70 |
| 2013/0233191 | A1* | 9/2013 | Mo et al. | 101/490 |
| 2014/0016950 | A1* | 1/2014 | Hitaka | 399/16 |

FOREIGN PATENT DOCUMENTS

| | | | | | |
|---|---|---|---|---|---|
| JP | 09-212035 | A | | 8/1997 | |
| JP | 11-327218 | A | | 11/1999 | |
| JP | 2008-107690 | | * | 5/2008 | G03G 15/20 |
| JP | 2008-216549 | A | | 9/2008 | |
| JP | 2008-216571 | | * | 9/2008 | G03G 15/20 |
| JP | 2009-075443 | A | | 4/2009 | |
| JP | 2010-066682 | A | | 3/2010 | |
| JP | 2010-072371 | | * | 4/2010 | G03G 15/20 |

OTHER PUBLICATIONS

Japanese Office Action dated May 7, 2014 in counterpart Japanese Application No. 2010-256368.

* cited by examiner

IMAGING FORMING SYSTEM COMPRISED OF IMAGE FORMING APPARATUSES ARRANGED IN SERIES, AND WHICH PREVENTS AN EXCESSIVE RISE IN EITHER OF AN INSIDE TEMPERATURE OR A FIXING SECTION TEMPERATURE OF A DOWNSTREAM IMAGE FORMING APPARATUS

BACKGROUND OF THE INVENTION

1. Field of the Invention

The present invention relates to an image forming system.

2. Description of the Related Art

Conventionally, there is known a tandem-type image forming system to improve the productivity, the tandem-type image forming system in which image forming apparatuses such as a printer and a copier which form images on sheets of paper are disposed in series, whereby double-sided printing is performed by using two image forming apparatuses which respectively form images on the sides of each sheet of paper.

For example, Japanese Patent Application Laid-Open Publication No. hei 8-234605 discloses a tandem-type image forming system including a first electrophotographic apparatus (provided on an upstream side) which forms an image on the front side of a sheet of paper, and a second electrophotographic apparatus (provided on a downstream side) which forms an image on the back side of the sheet thereof, wherein the fixing temperature of the second electrophotographic apparatus is appropriately controlled. More specifically, there is a plurality of heaters inside a heat roller of a fixing device of each of the first and second electrophotographic apparatuses, and the heaters heat different parts of the heat roller, for example, the center part of the heat roller, the end part thereof, and the whole thereof. In this tandem-type image forming system, when double-sided printing is performed, control is performed in order that the number of the heaters of the heat roller of the fixing device of the second electrophotographic apparatus, the heaters which heat a boundary part between a paper travelling area and a paper non-travelling area, becomes less than the number of the heaters of the heat roller of the fixing device of the first electrophotographic apparatus, whereby the temperature at the boundary part is prevented from going up too much.

In such a conventional tandem-type image forming system, when printing is continuously performed, the temperature inside the second electrophotographic apparatus (inside temperature, hereinbelow) goes up. When the inside temperature goes up too much, it is possible that toners in a develop device thereof melt. This is because a paper path from the fixing device of the first electrophotographic apparatus to a paper receiving portion of the second electrophotographic apparatus is short, and because the second electrophotographic apparatus receives a sheet in a short time after the first electrophotographic apparatus fixes an image on the sheet.

It is also possible that an image formed on a sheet becomes grainy. This is because, in the second electrophotographic apparatus, not only the inside temperature, but also the temperature of the fixing device goes up.

SUMMARY OF THE INVENTION

An object of the present invention is, in an image forming system in which image forming apparatuses are disposed in series, to prevent the inside temperature of an image forming apparatus disposed lower than another image forming apparatus in a paper carry direction, namely, disposed on a downstream side therein, and the temperature of a fixing section thereof from going up too much.

To achieve at least one object of the present invention, an aspect of the present invention is an image forming system including: a plurality of image forming apparatuses disposed in series, the image forming apparatuses which perform image formation on a sheet, the image forming apparatuses including: a first image forming apparatus; and a second image forming apparatus disposed lower than the first image forming apparatus in a paper carry direction, wherein the first image forming apparatus includes: a first image forming section which performs the image formation on a sheet; a first fixing section which performs image fixation on the sheet on which the first image forming section performs the image formation; and a first control section which makes, when the first image forming apparatus and the second image forming apparatus perform the image formation and the image fixation on different sides of a sheet to perform double-sided printing, thereby performing tandem outputting, a tandem-outputting target fixing temperature of the first fixing section lower than a first fiducial temperature which is a non-tandem-outputting target fixing temperature of the first fixing section for when the first image forming performs the image formation and the image fixation alone.

Preferably, in the image forming system, the first control section makes the tandem-outputting target fixing temperature of the first fixing section different in accordance with a paper type of the sheet.

Preferably, in the image forming system, the first control section makes, for a first sheet of a job, the tandem-outputting target fixing temperature of the first fixing section equal to the first fiducial temperature.

Preferably, in the image forming system, the second image forming apparatus includes a temperature detection section which detects an inside temperature of the second image forming apparatus, and when the inside temperature of the second image forming apparatus detected by the temperature detection section is a predetermined temperature or more, the first control section makes the tandem-outputting target fixing temperature of the first fixing section lower than when the inside temperature of the second image forming apparatus is less than the predetermined temperature.

Preferably, in the image forming system, three or more different temperatures are used as the tandem-outputting target fixing temperature of the first fixing section, and the first control section makes the tandem-outputting target fixing temperature of the first fixing section lower, as the inside temperature of the second image forming apparatus detected by the temperature detection section becomes higher.

Preferably, in the image forming system, the first control section measures a printing duration during which the tandem outputting continues, and when the measured printing duration is a predetermined duration or more, the first control section makes the tandem-outputting target fixing temperature of the first fixing section lower than when the printing duration is less than the predetermined duration.

Preferably, in the image forming system, the first control section counts a number of sheets on which the tandem outputting is continuously performed, and when the counted number of sheets is a predetermined number or more, the first control section makes the tandem-outputting target fixing temperature of the first fixing section lower than when the counted number of sheets is less than the predetermined number.

Preferably, in the image forming system, the second image forming apparatus includes: a second image forming section which performs the image formation on a sheet; a second fixing section which performs the image fixation on the sheet on which the second image forming section performs the image formation; and a second control section which makes, when the tandem outputting is performed, a tandem-outputting target fixing temperature of the second fixing section lower than a second fiducial temperature which is a non-tandem-outputting target fixing temperature of the second fixing section for when the second image forming apparatus performs the image formation and the image fixation alone.

Preferably, in the image forming system, the second control section makes the tandem-outputting target fixing temperature of the second fixing section different in accordance with a paper type of the sheet.

BRIEF DESCRIPTION OF THE DRAWINGS

The present invention is fully understood from the detailed description given hereinbelow and the accompanying drawings, which are given byway of illustration only, and thus are not intended as limits of the present invention, wherein.

DESCRIPTION OF THE PREFERRED EMBODIMENT

First to eighth embodiments of the present invention are described in detail with reference to the accompanying drawings. However, the present invention is not limited to the drawings.

First Embodiment

Figure 1:
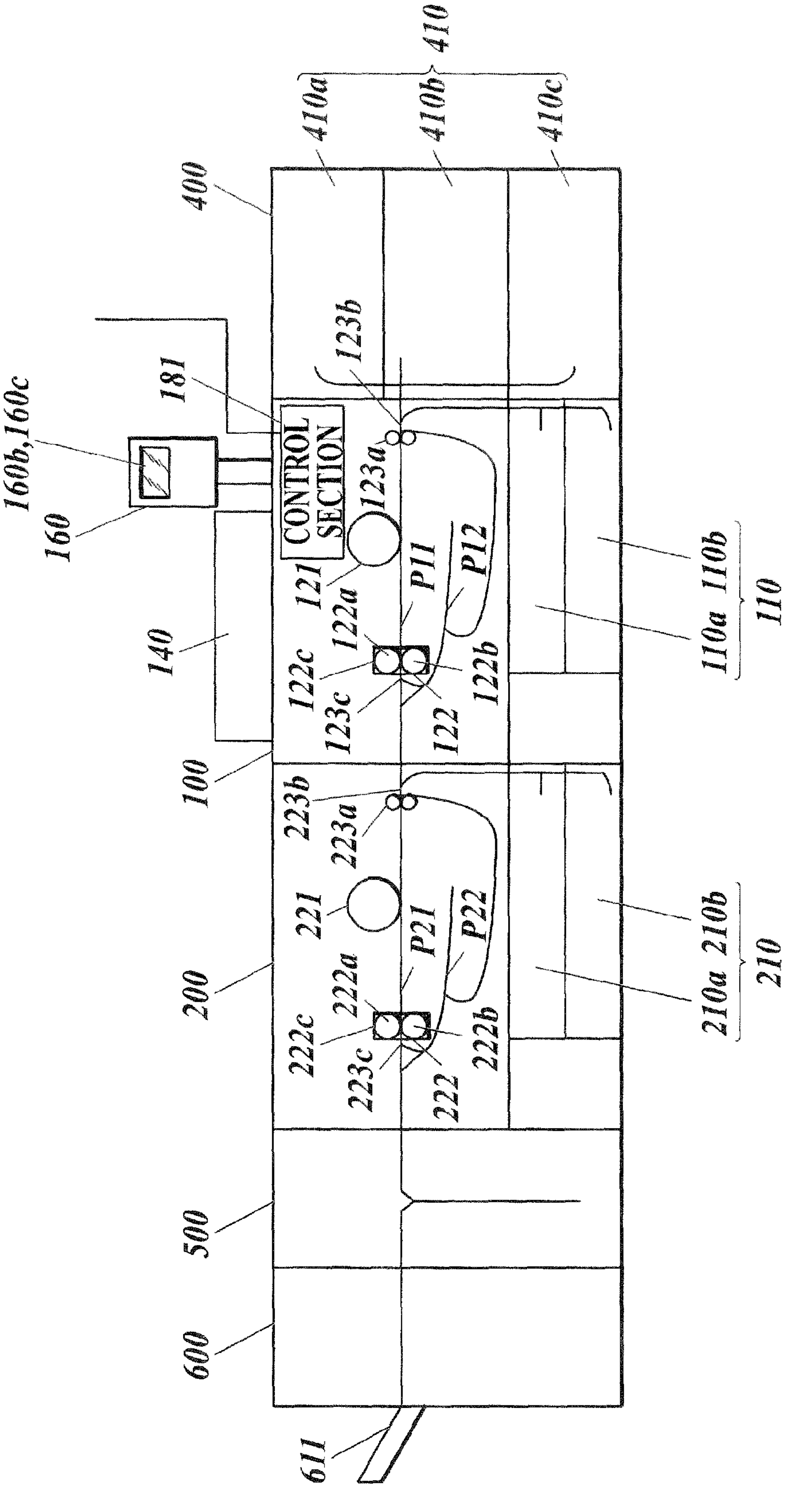
FIG. 1 shows the overall configuration of an image forming system according to a first embodiment of the present invention.
Figure 2:
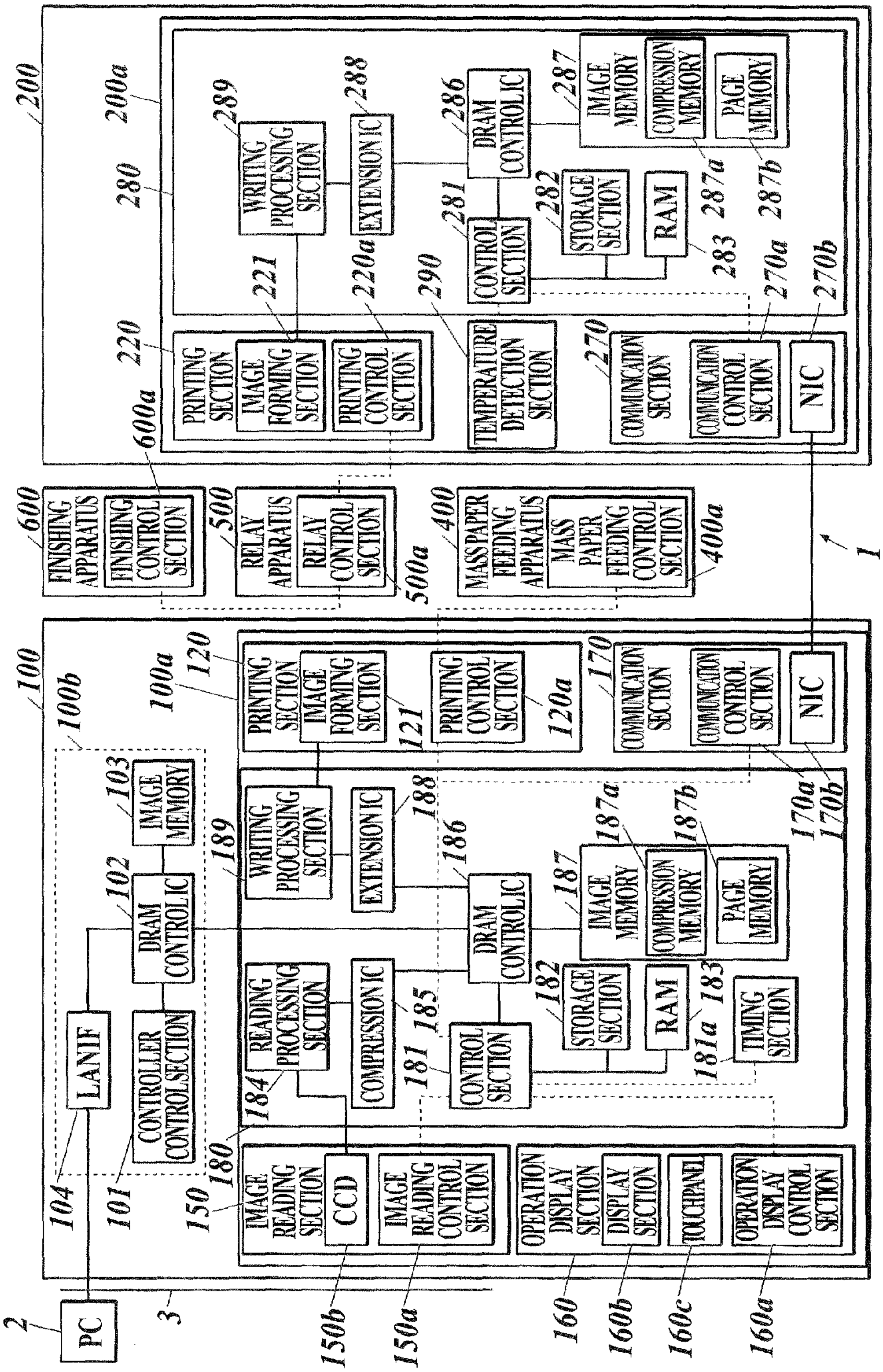
FIG. 2 is a block diagram of the functional configuration of the image forming system.

The first embodiment of the present invention is described with reference to FIGS. 1 to 3. First, with reference to FIGS. 1 and 2, the configuration of an image forming system 1 of the embodiment is described. FIG. 1 shows the overall configuration of the image forming system 1, and FIG. 2 shows the functional configuration of the image forming system 1.

As shown in FIG. 1, the image forming system 1 includes a first image forming apparatus 100, a second image forming apparatus 200, a mass paper feeding apparatus 400, a relay apparatus 500, and a finishing apparatus 600. The image forming system 1 adopts a tandem-type configuration in which the above-mentioned apparatuses are connected in series so as to be integrated. In the image forming system 1, the mass paper feeding apparatus 400, the first image forming apparatus 100, the second image forming apparatus 200, the relay apparatus 500, and the finishing apparatus 600 are disposed in the order named from an upstream side in a paper carry direction.

The first image forming apparatus 100 works as a master machine into which a job is inputted, and which controls and manages the second image forming apparatus 200 and itself (first image forming apparatus 100). The second image forming apparatus 200 forms images (image formation) by itself, and also works as a slave machine which forms images under the control of the master machine, namely, the first image forming apparatus 100.

The image forming system 1 forms images (image formation) and fixes the images (image fixation), namely printing, on sheets of paper with the first image forming apparatus 100 and the second image forming apparatus 200, the sheets which are fed from the mass paper feeding apparatus 400, a paper feeding tray of the first image forming apparatus 100, or a paper feeding tray of the second image forming apparatus 200; performs predetermined finishing on the sheets with the finishing apparatus 600; and outputs the sheets (paper ejection) therefrom. Each of the first image forming apparatus 100 and the second image forming apparatus 200 can perform image formation on one side of a sheet and on both sides of a sheet.

In a case where the first image forming apparatus 100 and the second image forming apparatus 200 respectively perform image formation on the sides of a sheet, the first image forming apparatus 100 performs the image formation on one side (front side) of a sheet fed from the mass paper feeding apparatus 400 or the like, and reverses the sheet. Then, the second image forming apparatus 200 performs the image formation on the other side (back side) of the sheet. Thereafter, the relay apparatus 500 reverses the sheet, and the finishing apparatus 600 performs finishing on the sheet and ejects the sheet therefrom.

The first image forming apparatus 100 includes a paper feeding tray 110, a printing section 120, an ADF (Auto Document Feeder) 140, and an operation display section 160. That is, the first image forming apparatus 100 is the so-called MFP (Multi-Functional Peripheral) which functions as a scanner, a copier, a printer, and the like. In the embodiment, the first image forming apparatus 100 and the second image forming apparatus 200 are described as image forming apparatuses which form monochrome images. However, this is not a limit. The first image forming apparatus 100 and the second image forming apparatus 200 may be image forming apparatuses which form color images with four colors of C (cyan), M (magenta), Y (yellow), and K (black).

The paper feeding tray 110 includes trays **110*a* and 110*b*. Sheets classified based on the weight, the size, and the like are housed in their proper trays. What kind of sheet each of the trays 110*a* and 110*b* stores is set by a user. The sheets housed in the paper feeding tray 110 are carried to the printing section 120** taking a paper carry path with carry rollers (not shown).

The printing section 120 performs electrophotographic image formation processing (printing processing) based on the data of the inputted job (image data). The printing section 120 includes an image forming section 121 (first image forming section), a fixing section 122 (first fixing section), resist rollers 123*a*, and paper carry path switching sections 123*b* and 123*c*.

The image forming section 121 includes a photosensitive drum as an image holder, a charger, an exposure section (a laser light source and a polygon mirror), a develop section, a transfer section, and a paper separation/electricity removal section, and a cleaner (all not shown). When image formation is performed, the image forming section 121 exposes the surface of the photosensitive drum to laser light with the laser light source and the polygon minor, the photosensitive drum which is uniformly charged with the charger and rotates, so as to form an electrostatic latent image corresponding to the image data on the surface of the photosensitive drum. Then, the image forming section 121 reverses and develops the electrostatic latent image with the develop section so as to forma black toner image on the photosensitive drum. Then, when the toner image is formed, the image forming section 121 sends out the fed sheet to a transfer region with the resist rollers 123*a* in such a way as to synchronize with the timing at which the toner image formed on the photosensitive drum reaches the transfer region. Then, the image forming section 121 transfers the toner image formed on the surface of the photosensitive drum to the sheet at the transfer region, the sheet which is charged to have the pole opposite to the pole of the toner image. Then, the image forming section 121 separates the sheet on which the toner image is held from the surface of the photosensitive drum with the paper separation/electricity removal section, sends out the sheet to the fixing section 122, and removes the toners left on the photosensitive drum with the cleaner.

The resist rollers 123*a* are rollers which carry a sheet to the image forming section 121, while adjusting its timing. The paper carry path for carrying the sheet to the image forming section 121 and the fixing section 122 via the resist rollers 123*a* and ejecting the sheet from the first image forming apparatus 100 is referred to as a main path P11. The paper carry path for reversing the sheet which passes through the fixing section 122 and carrying the sheet to the resist rollers 123*a* or to a paper ejection side (second image forming apparatus 200) is referred to as a reverse path P12. Both the main path P11 and the reverse path P12 are provided with carry rollers (not shown) for carrying sheets.

In a case where the image forming section 121 has a configuration to form color images, the image forming section 121 includes the components described above for each of the colors of C, M, Y, and K, thereby forming toner images of the C, M, Y, and K colors on an intermediate transfer belt which serves as an image holder, and transferring the toner images to a sheet.

The fixing section 122 includes a heat roller 122*a* which is heated by a halogen heater or an IH (Induction Heating) and a pressure roller 122*b* which pressurizes the heat roller 122*a* from underneath, and heats and pressurizes a sheet with the heat roller 122*a* and the pressure roller 122*b*, the sheet which holds the toner image, thereby performing image fixation processing.

The fixing section 122 includes a cover 122*c* and a temperature sensor (not shown). The cover 122*c* covers the heat roller 122*a* and the pressure roller 122*b*, thereby preventing the temperature inside the fixing section 122 from influencing the temperature outside the fixing section 122. The temperature sensor of the fixing section 122 detects the temperature inside the fixing section 122 (fixing temperature of the fixing section 122), and outputs temperature information on the detected temperature to a control section 181 (first control section). The control section 181 adjusts the fixing temperature of the fixing section 122 to a target fixing temperature based on the temperature information received from the temperature sensor of the fixing section 122.

The paper carry path switching section 123*b* switches the paper carry path so that a sheet carried from the mass paper feeding apparatus 400 or a sheet carried from the paper feeding tray 110 is carried into the printing section 120. The paper carry path switching section 123*c* switches the paper carry path for the sheet which passes through the fixing section 122 to the main path P11 or the reverse path P12.

The ADF 140 automatically carries documents placed on a tray for document placement to an image reading section 150, which is described below, from the top in order.

The operation display section 160 includes a display section 160*b* constituted of an LCD (Liquid Crystal Display) or the like, a touch panel 160*c* disposed to cover the display section 160*b*, and an operation key set (not shown). The operation display section 160 receives operation commands from a user, and outputs operation signals corresponding to the operation commands to the control section 181. In addition, the operation display section 160 displays various setting screens for inputting various operation commands and pieces of setting information, various processing results, and the like in accordance with display signals inputted from the control section 181.

The second image forming apparatus 200 includes a paper feeding tray 210 and a printing section 220.

The paper feeding tray 210 includes trays 210*a* and 210*b*. Sheets classified based on the weight, the size, and the like are housed in their proper trays. What kind of sheet each of the trays 210*a* and 210*b* stores is set by a user. The sheets housed in the paper feeding tray 210 are carried to the printing section 220 taking a paper carry path with carry rollers (not shown).

The printing section 220 performs electrophotographic image formation processing based on the data of the inputted job (image data). The printing section 220 includes an image forming section 221 (second image forming section), a fixing section 222 (second fixing section), resist rollers 223*a*, and paper carry path switching sections 223*b* and 223*c*. The image forming section 221, the fixing section 222, the resist rollers 223*a*, the paper carry path switching sections 223*b* and 223*c*, a main path P21, and a reverse path P22 are respectively the same as the image forming section 121, the fixing section 122, the resist rollers 123*a*, the paper carry path switching sections 123*b* and 123*c*, the main path P11, and the reverse path P11 in configuration. Therefore, the detailed description thereof is omitted.

The fixing section 222, like the fixing section 122, includes a heat roller 222*a*, a pressure roller 222*b*, a cover 222*c*, and a temperature sensor (not shown). The fixing section 222 heats and pressurizes a sheet with the heat roller 222*a* and the pressure roller 222*b*, the sheet which holds a toner image, thereby performing fixing processing. A control section 281 (second control section) described below adjusts the fixing temperature of the fixing section 222 to a target fixing temperature based on temperature information on a detected fixing temperature of the fixing section 222 received from the temperature sensor of the fixing section 222.

The paper carry path switching section 223*b* switches the paper carry path so that a sheet carried from the first image forming apparatus 100 or a sheet carried from the paper feeding tray 210 is carried into the printing section 220. The paper carry path switching section 223*c* switches the paper carry path for the sheet which is sent out from the fixing section 222 to the relay apparatus 500 or to the reverse path P22 for reversing a sheet, on one side of which image fixation is already performed. The sheet reversed by the reverse path P22 is carried to the image forming section 221 again, and image formation is performed on the other side of the sheet.

The mass paper feeding apparatus 400 includes a paper feeding tray 410. The paper feeding tray 410 includes a plurality of trays 410*a*, 410*b*, and 410*c*. Sheets classified based on the weight, the size, and the like are housed in their proper trays. What kind of sheet each of the trays 410*a*, 410*b*, and 410*c* stores is set by a user. The sheets housed in the paper feeding tray 410 are carried to the first image forming apparatus 100 with carry rollers (not shown).

The relay apparatus 500 passes sheets from the second image forming apparatus 200 to the finishing apparatus 600 in such a way that the efficiency as the whole system is not decreased even when there is difference between the second image forming apparatus 200 and the finishing apparatus 600 in throughput. The relay apparatus 500 also reverses the sheets carried from the second image forming apparatus 200, and sends out the sheets to the finishing apparatus 600.

The finishing apparatus 600 performs predetermined finishing on the sheets sent out from the relay apparatus 500. The finishing performed by the finishing apparatus 600 is, for example, sorting, cutting, punching, stapling, or casing. The finishing apparatus 600 includes a paper ejection tray 611, and ejects sheets to the paper ejection tray 611.

Next, the functional configuration of the image forming system 1 is described with reference to FIG. 2.

The image forming system 1 includes the first image forming apparatus 100, the second image forming apparatus 200, the mass paper feeding apparatus 400, the relay apparatus 500, and the finishing apparatus 600.

The first image forming apparatus 100 is constituted of a main body 100*a* and a printer controller 100*b*. The first image forming apparatus 100 is connected to a PC (Personal Computer) 2 on a network 3 via a LANIF (Local Area Network InterFace) 104 of the printer controller 100*b* so as to transmit/receive data to/from the PC 2.

The main body 100*a* includes the printing section 120, the image reading section 150, the operation display section 160, a communication section 170, and an image control substrate 180. The components described with reference to FIG. 1 are denoted by the same reference numerals in FIG. 2, and the description thereof is omitted.

The image control substrate 180 includes the control section 181, a storage section 182, a RAM (Random Access Memory) 183, a reading processing section 184, a compression IC (Integrated Circuit) 185, a DRAM (Dynamic Random Access Memory) control IC 186, an image memory 187, an extension IC 188, a writing processing section 189, and a timing section 181*a*.

The control section 181 is constituted of a CPU (Central Processing Unit) or the like. The control section 181 reads a system program and a program specified from among various application programs stored in the storage section 182, expands the read programs in the RAM 183, performs processing and controls the components of the first image forming apparatus 100 by cooperating with the programs expanded in the RAM 183.

The storage section 182 is constituted of a nonvolatile semiconductor memory or the like, and stores the system program, the application programs, various data, and the like therein. The programs are stored in a form of program codes readable by a computer. The control section 181 performs operations in accordance with the program codes. A first fixing temperature management program described below is stored in the storage section 182.

The RAM 183 is constituted of a volatile semiconductor memory or the like, and includes a work area in which various programs to be executed by the control section 181 and various data and the like for the programs are temporarily stored.

The reading processing section 184 performs various kinds of processing such as analog signal processing, A/D (Analog to Digital) conversion, and shading, on analog image signals inputted from the image reading section 150, thereby generating digital image data, and outputting the digital image data to the compression IC 185.

The compression IC 185 compresses the inputted digital image data, and outputs the compressed digital image data to the DRAM control IC 186.

The DRAM control IC 186 controls the compression of the image data performed by the compression IC 185 and extension of the compressed image data performed by the extension IC 188, and controls input/output of the image data into/from the image memory 187, when instructed by the control section 181.

For example, when instructed by the control section 181 to store image data read by the image reading section 150, the DRAM control IC 186 makes the compression IC 185 compress the image data inputted from the reading processing section 184, and stores the compressed image data in a compression memory 187*a* of the image memory 187. Furthermore, when instructed by the control section 181 to output the compressed image data stored in the compression memory 187*a* for printing, the DRAM control IC 186 reads the compressed image data from the compression memory 187*a*, makes the extension IC 188 extend the compressed image data, and stores the extended image data in a page memory 187*b* of the image memory 187. Then, the DRAM control IC 186 reads that non-compressed image data from the page memory 187*b*, and outputs the read non-compressed image data to the writing processing section 189. After the printing section 120 forms an image based on the image data, the DRAM control IC 186 deletes the image data from the image memory 187, the image data based on which the image is formed. Furthermore, the DRAM control IC 186 outputs setting information on a job inputted from the printer controller 100*b* to the control section 181.

The image memory 187 is constituted of, for example, a DRAM which is a volatile memory, and includes the compression memory 187*a* and the page memory 187*b*. The compression memory 187*a* stores compressed image data therein. The page memory 187*b* temporarily stores non-compressed (extended) image data therein, the non-compressed image data on which an image is to be formed.

The extension IC 188 extends compressed image data.

The writing processing section 189 generates PWM (Pulse Width Modulation) signals based on image data inputted from the extension IC 188, and outputs the generated PWM signals to the printing section 120.

The timing section 181*a* measures a current time, and outputs time information on the measured current time to the control section 181.

The image reading section 150 reads a document carried by the ADF 140. More specifically, the image reading section 150 scans the document with light emitted from a light source, and performs photoelectric conversion on reflected light reflected by the document with a CCD (Charge Coupled Device) 150*b*. The image reading section 150 obtains document image data from the document read by performing the photoelectric conversion. The image reading section 150 includes an image reading control section 150*a*. The image reading control section 150*a* controls drive of the components such as the CCD 150*b* based on control signals from the control section 181, and consequently, as described above, document image data is obtained. The obtained document image data is outputted to the reading processing section 184.

The operation display section 160 includes an operation display control section 160*a*. The operation display control section 160*a* controls display performed on the display section 160*b* based on control signals from the control section 181. Furthermore, the operation display control section 160*a* outputs operation signals inputted from the operation key (hard key) set or the touch panel 160*c* to the control section 181.

The printing section 120 includes a printing control section 120*a*, the image forming section 121, and the fixing section 122. The printing control section 120*a* performs data communication with the control section 181, and controls operations of the components of the printing section 120 based on control signals from the control section 181. For example, the printing control section 120*a* makes the image forming section 121 perform image formation on sheets and makes the fixing section 122 perform image fixation on the sheets, based on PWM signals inputted from the writing processing section 189. Furthermore, the printing control section 120*a* performs data communication with the mass paper feeding apparatus 400, and instructs the mass paper feeding apparatus 400, for example, to supply sheets based on control signals from the control section 181.

The communication section 170 includes a communication control section 170*a* and an NIC (Network Interface Card) 170*b*. The NIC 170*b* is a communication interface for connecting with the second image forming apparatus 200, and transmits/receives data to/from the second image forming apparatus 200. The communication control section 170*a* controls transmission of job data or image data transmitted from the control section 181 to the second image forming apparatus 200 via the NIC 170*b*, based on control signals from the control section 181. More specifically, that compressed image data is read from the compression memory 187*a* by the DRAM control IC 186, temporarily stored in a system memory of the control section 181, outputted from the system memory to the communication control section 170*a* at predetermined timing, and then transmitted from the communication control section 170*a* to the second image forming apparatus 200 by the NIC 170*b*.

The printer controller 100*b* manages and controls image data and jobs inputted to the first image forming apparatus 100 from the PC 2 connected to the network 3 in a case where the image forming system 1 is used for a network printer.

The printer controller 100*b* includes a controller control section 101, a DRAM control IC 102, an image memory 103, and a LANIF 104.

The controller control section 101 controls the components of the printer controller 100*b* overall, and transmits data inputted from the PC 2 as job data to the main body 100*a* via the LANIF 104.

The DRAM control IC 102 controls storage of the data received by the LANIF 104 into the image memory 103 and reading of the data from the image memory 103. Furthermore, the DRAM control IC 102 is connected with the DRAM control IC 186 of the image control substrate 180 by a PCI (Peripheral Components Interconnect) bus, and reads the data to be printed from the image memory 103 and outputs the read data to the DRAM control IC 186 when instructed by the controller control section 101.

The image memory 103 is constituted of a DRAM or the like, and temporarily stores the inputted data, which is to be outputted, therein.

The LANIF 104 is a communication interface such as an NIC or a modem for connecting to the network 3 such as a LAN, and receives data from the PC 2. The received data is outputted to the DRAM control IC 102.

The second image forming apparatus 200 includes a main body 200*a*. The main body 200*a* includes the printing section 220, a communication section 270, and an image control substrate 280.

The image control substrate 280 includes the control section 281, a storage section 282, a RAM 283, a DRAM control IC 286, an image memory 287, an extension IC 288, a writing processing section 289, and a temperature detection section 290.

The control section 281 is constituted of a CPU or the like. The control section 281 reads a system program and a program specified from among various application programs stored in the storage section 282, expands the read programs in the RAM 283, performs processing and controls the components of the second image forming apparatus 200 by cooperating with the programs expanded in the RAM 284.

The storage section 282 is constituted of a nonvolatile semiconductor memory or the like, and stores the system program, the application programs, various data, and the like therein. The programs are stored in a form of program codes readable by a computer. The control section 281 performs operations in accordance with the program codes.

The RAM 283 is constituted of a volatile semiconductor memory or the like, and includes a work area in which various programs to be executed by the control section 281 and various data and the like for the programs are temporarily stored.

The DRAM control IC 286 controls extension of compressed image data performed by the extension IC 288, and controls input/output of the image data into/from the image memory 287, when instructed by the control section 281.

For example, when instructed by the control section 281 to store image data transmitted from the first image forming apparatus 100, the DRAM control IC 286 stores compressed image data thereof transmitted from the first image forming apparatus 100 in a compression memory 287*a* of the image memory 287. Furthermore, when instructed by the control section 281 to output the compressed image data stored in the compression memory 287*a* for printing, the DRAM control IC 286 reads the compressed image data from the compression memory 287*a*, makes the extension IC 288 extend the compressed image data, and stores the extended image data in a page memory 287*b* of the image memory 287. Then, the DRAM control IC 286 reads that non-compressed image data from the page memory 287*b*, and outputs the read non-compressed image data to the writing processing section 289. After the printing section 220 forms an image based on the image data, the DRAM control IC 286 deletes the image data from the image memory 287, the image data based on which the image is formed.

The image memory 287 is constituted of, for example, a DRAM which is a volatile memory, and includes the compression memory 287*a* and the page memory 287*b*. The compression memory 287*a* and the page memory 287*b* are respectively the same as the compression memory 187*a* and the page memory 187*b* of the first image forming apparatus 100 in functional configuration. Therefore, the detailed description thereof is omitted.

The extension IC 288 extends compressed image data.

The writing processing section 289 generates PWM signals based on image data inputted from the extension IC 288, and outputs the generated PWM signals to the printing section 220.

The temperature detection section 290 includes a thermometer for detecting the inside temperature of the second image forming apparatus 200 (apparatus 200 inside temperature), and outputs inside temperature information on the detected inside temperature thereof to the control section 281. The temperature detection section 290 is disposed, for example, in the vicinity of a transfer section (secondary transfer section, in the case where the second image forming apparatus 200 has a configuration to form color images) of the image forming section 221.

The printing section 220 includes a printing control section 220*a*, the image forming section 221, and the fixing section 222. The printing control section 220*a* performs data communication with the control section 281, and controls operations of the components of the printing section 220 based on control signals from the control section 281. For example, the printing control section 220*a* makes the image forming section 221 perform image formation on sheets and makes the fixing section 222 perform image fixation on the sheets, based on PWM signals inputted from the writing processing section 289. Furthermore, the printing control section 220*a* performs data communication with the relay apparatus 500, and instructs the relay apparatus 500 and the finishing apparatus 600, for example, to perform finishing on sheets.

The communication section 270 includes a communication control section 270*a* and an NIC 270*b*. The NIC 270*b* is a communication interface for connecting with the first image forming apparatus 100, and transmits/receives data to/from the first image forming apparatus 100.

The mass paper feeding apparatus 400 includes amass paper feeding control section 400*a*, and controls the components of the mass paper feeding apparatus 400. More specifically, for example, when instructed by the first image forming apparatus 100, the mass paper feeding control section 400*a* controls supply of sheets to the first image forming apparatus 100.

The relay apparatus 500 includes a relay control section 500*a*, and controls the components of the relay apparatus 500. More specifically, for example, when instructed by the second image forming apparatus 200, the relay control section 500*a* receives sheets ejected from the second image forming apparatus 200, and instructs the finishing apparatus 600 to perform finishing on the sheets.

The finishing apparatus 600 includes a finishing control section 600*a*, and controls the components of the finishing apparatus 600. More specifically, for example, when instructed by the relay apparatus 500, the finishing control section 600*a* controls finishing on the sheets carried to the finishing apparatus 600.

Next, the operations of the image forming system 1 in the embodiment are described with reference to FIG. 3. FIG. 3 shows first fixing temperature management processing performed by the first image forming apparatus 100.

The first fixing temperature management processing performed by the first image forming apparatus 100 is processing to manage a target value of the fixing temperature (target fixing temperature) of the fixing section 122 for when the printing is performed thereby. In the first fixing temperature management processing, when double-sided printing is performed, the target fixing temperature (tandem-outputting target fixing temperature) of the fixing section 122 of the first image forming apparatus 100 is managed to be lower than the target fixing temperature of the first image forming apparatus 100 for when the first image forming apparatus 100 performs printing by itself (non-tandem-outputting target fixing temperature). In the following, unless different description is made, double-sided printing is tandem-type double-sided printing performed by the first image forming apparatus 100 and the second image forming apparatus 200 which are connected in series. That is, the first image forming apparatus 100 performs printing on one side of a sheet, and the second image forming apparatus 200 performs printing on the other side of the sheet, whereby the tandem-type double-sided printing (tandem outputting) is performed.

In the present embodiment and the other embodiments, in order to make description simple, the number of paper types of sheets on which printing is performed are two, plain paper and thick paper. However, this is not a limit, and hence the number of paper types thereof may be one or more than two. The paper type of a sheet includes elements such as the weight and the size of the sheet, the elements which influence on the target fixing temperature. Job data includes paper mode information on sheets of paper. The paper mode information includes at least information on, which of double-sided printing or single-sided printing is performed on each sheet, and information on the paper type of each sheet.

Table 1 shows fiducial temperatures FT as the target value of the fixing temperature (target fixing temperature) of the fixing section 122 of the first image forming apparatus 100 and the target value of the fixing temperature (target fixing temperature) of the fixing section 222 of the second image forming apparatus 200 for each paper type.

TABLE 1

| Paper Type | Plain Paper | Thick Paper |
|---|---|---|
| Apparatus 100 | 160° C. | 180° C. |
| Apparatus 200 | 160° C. | 180° C. |

The fiducial temperature FT of the first image forming apparatus 100 (first fiducial temperature) is the target fixing temperature of the first image forming apparatus 100 for when the first image forming apparatus 100 performs printing (image formation and image fixation) by itself, namely, the non-tandem-outputting target fixing temperature of the first image forming apparatus 100. The fiducial temperature FT of the second image forming apparatus 200 (second fiducial temperature) is the target fixing temperature of the second image forming apparatus 200 for when the second image forming apparatus 200 performs printing (image formation and image fixation) by itself, namely, the non-tandem-outputting target fixing temperature of the second image forming apparatus 200. As shown in Table 1, the fiducial temperature FT of the fixing section 122 of the first image forming apparatus 100 is the same as the fiducial temperature FT of the fixing section 222 of the second image forming apparatus 200 for each paper type. However, this is not a limit, and hence the fiducial temperature FT of the fixing section 122 of the first image forming apparatus 100 and the fiducial temperature FT of the fixing section 222 of the second image forming apparatus 200 may be different from each other.

Table 2 shows the target fixing temperatures of the first image forming apparatus 100 and the second image forming apparatus 200 for each paper type for when double-sided printing is performed (tandem-outputting target fixing temperature) in the first fixing temperature management processing.

TABLE 2

| Paper Type | Plain Paper | Thick Paper |
|---|---|---|
| Apparatus 100 | 150° C. (FT-10° C.) | 175° C. (FT-5° C.) |
| Apparatus 200 | 160° C. | 180° C. |

As shown in Table 2, the target fixing temperature of the first image forming apparatus 100 for plain paper is decreased by 10° C. from the fiducial temperature FT thereof, and the target fixing temperature of the first image forming apparatus 100 for thick paper is decreased by 5° C. from the fiducial temperature FT thereof.

As shown in Table 2, the target fixing temperature of the second image forming apparatus 200 is the same as the fiducial temperature thereof for each paper type. This is because the inside temperature of the second image forming apparatus 200 (apparatus 200 inside temperature) is little influenced by the change of the fixing temperature of the fixing section 222. On the other hand, the inside temperature thereof is greatly influenced by the temperature of a sheet carried from the first image forming apparatus 100 to the second image forming apparatus 200. Therefore, the target fixing temperature of the first image forming apparatus 100 is decreased, so that the temperature of the sheet ejected and carried from the first image forming apparatus 100 to the second image forming apparatus 200 decreases, and the inside temperature of the second image forming apparatus 200 decreases, accordingly.

In the first fixing temperature management processing, the target fixing temperatures of the first image forming apparatus 100 and the second image forming apparatus 200 for when single-sided printing is performed are respectively the same as the fiducial temperatures FT thereof for each paper type.

In the first image forming apparatus 100, for example, input of a job for single-sided printing or a job for double-sided printing into the first image forming apparatus 100 triggers the first fixing temperature management processing. That is, when such a job is inputted, the control section 181 performs the first fixing temperature management processing in accordance with a first fixing temperature management program read from the storage section 182 and expanded in the RAM 183. The input of a job is that job data is generated by reproducing a document image, for example, by reading a document with the image reading section 150, or that job data is transmitted from the PC 2 and received by the printer controller **100*b*. These job data are stored in the image memory 187**.

When a job for single-sided printing or a job for double-sided printing is input, the control section 181 of the first image forming apparatus 100 makes the printing section 120 and the second image forming apparatus 200 perform single-sided printing or double-sided printing in accordance with the job data. That is, the first fixing temperature management processing and printing processing are performed in parallel. This applies to fixing temperature management processing in the other embodiments too.

Figure 3:
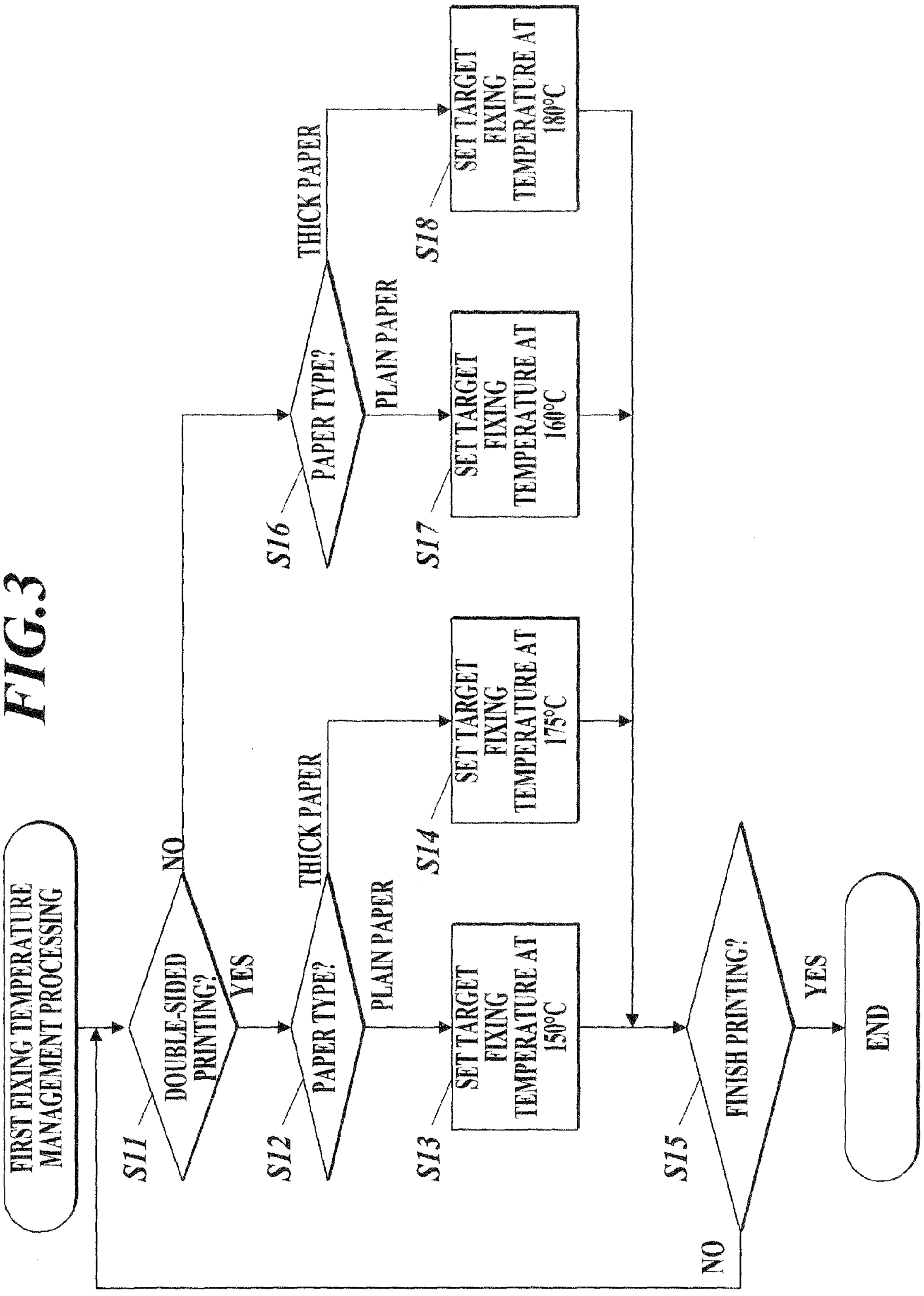
FIG. 3 is a flowchart of first fixing temperature management processing performed by a first image forming apparatus of the image forming system.

As shown in FIG. 3, the control section 181 first refers to paper mode information of the job data, and then judges which of single-sided printing and double-sided printing is performed on a sheet on which printing is about to be performed (Step S11). When judging that double-sided printing is performed on the sheet (Step S11; YES), the control section 181 refers to the paper mode information of the job data, and judges what paper type the sheet is (Step S12).

When judging that the paper type of the sheet is plain paper (Step S12; Plain Paper), the control section 181 sets the target fixing temperature of the fixing section 122 at 150° C. (Step S13). When judging that the paper type of the sheet is thick paper (Step S12; Thick Paper), the control section 181 sets the target fixing temperature of the fixing section 122 at 175° C. (Step S14). Thereafter, the control section 181 refers to the paper mode information of the job data to find out if there is another sheet on which printing be performed, thereby judging whether to finish printing or not (Step S15). When judging that the printing is not finished (Step 15; NO), the control section 181 moves to Step S11. When judging that the printing is finished (Step S15; YES), the control section 181 ends the first fixing temperature management processing.

When judging that single-sided printing is performed on the sheet (Step S11; NO), the control section 181 refers to the paper mode information of the job data, and judges what paper type the sheet is (Step S16). When judging that the paper type of the sheet is plain paper (Step S16; Plain Paper), the control section 181 sets the target fixing temperature of the fixing section 122 at 160° C. (Step S17), and moves to Step S15. When judging that the paper type of the sheet is thick paper (Step S16; Thick Paper), the control section 181 sets the target fixing temperature of the fixing section 122 at 180° C. (Step S18), and moves to Step S15. Thus, when single-sided printing is performed, the control section 181 sets the target fixing temperature of the fixing section 122 at the value of the fiducial temperature FT thereof for each paper type.

In response to the start of the first fixing temperature management processing, the control section 281 of the second image forming apparatus 200 sets the target fixing temperature of the fixing section 222 at the value of the fiducial temperature FT thereof for each paper type.

As described above, according to the present embodiment, in the image forming system 100, when the first image forming apparatus 100 and the second image forming apparatus 200 perform image formation and image fixation on different sides of a sheet to perform double-sided printing, thereby performing tandem outputting, the control section 181 sets the target fixing temperature of the fixing section 122 at a value lower than the value of the fiducial temperature FT thereof. Accordingly, the temperature of a sheet carried from the first image forming apparatus 100 to the second image forming apparatus 200 decreases, and hence the inside temperature of the second image forming apparatus 200 and the temperature of the fixing section 222 can be prevented from going up too much. Therefore, the toners of the develop section of the image forming section 221 can be prevented from melting, which is caused when the inside temperature of the second image forming apparatus 200 goes up too much, and images formed on sheets can be prevented from becoming grainy, which is caused when the temperature of the fixing section 222 goes up too much.

Furthermore, the control section 181 sets the target fixing temperature of the fixing section 122 at a value different in accordance with the paper type (plain paper or thick paper) of a sheet. Accordingly, the inside temperature of the second image forming apparatus 200 and the temperature of the fixing section 222 can be appropriately managed in accordance with the paper type of a sheet, and prevented from going up too much.

Second Embodiment

Figure 4:
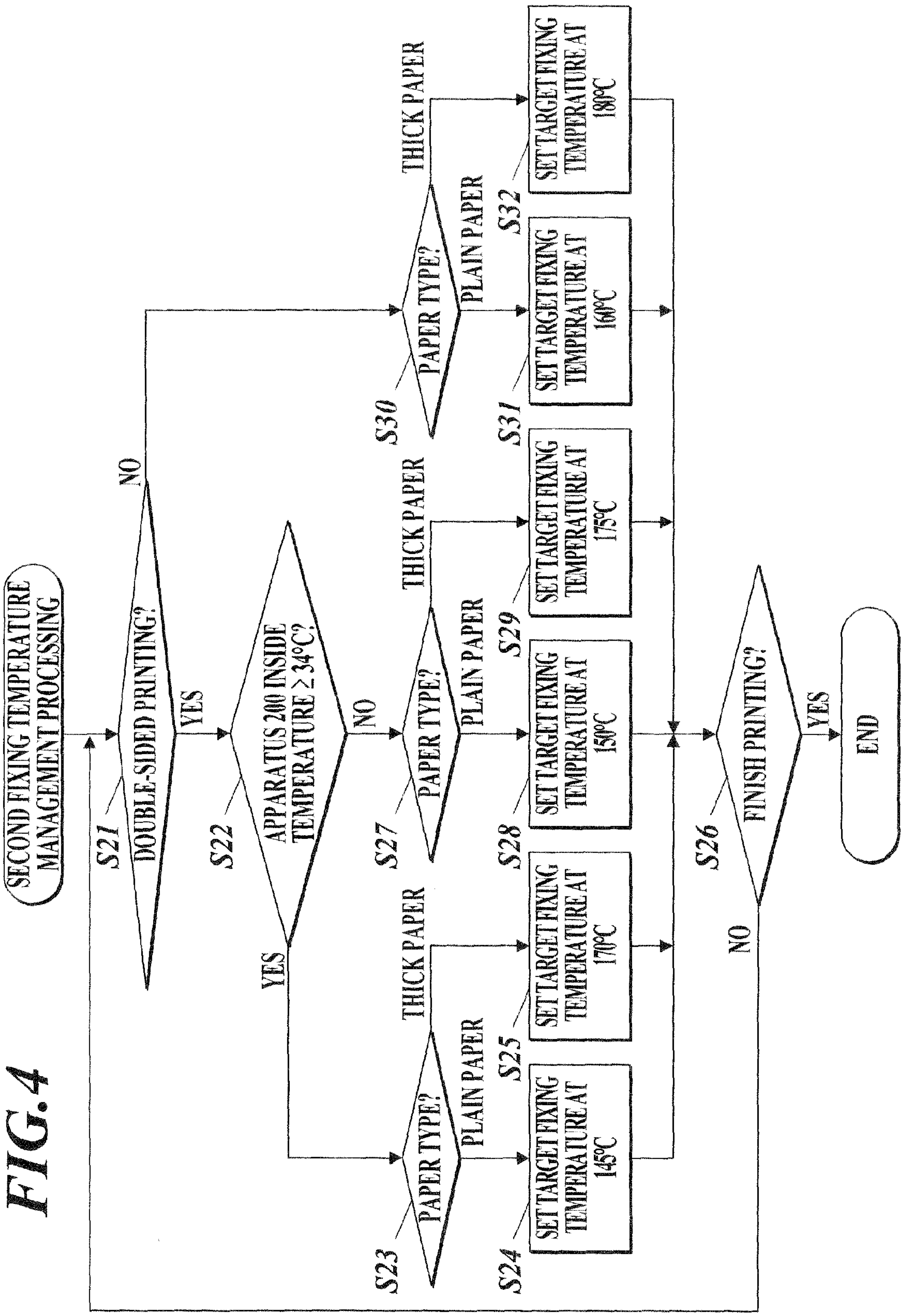
FIG. 4 is a flowchart of second fixing temperature management processing performed by the first image forming apparatus.

The second embodiment of the present invention is described with reference to FIG. 4. FIG. 4 shows second fixing temperature management processing performed by the first image forming apparatus 100.

In the second embodiment as well, the image forming system 1 is used. Therefore, in order to avoid repeating the same description, the description of the configurations of the apparatuses of the image forming system 1 is omitted. However, in the embodiment, a second fixing temperature management program is stored in the storage section 182 instead of the first fixing temperature management program.

Next, the operations of the image forming system 1 in the embodiment are described with reference to FIG. 4. The second fixing temperature management processing performed by the first image forming apparatus 100 is processing to manage the target fixing temperature of the fixing section 122 for when the printing is performed thereby. In the second fixing temperature management processing, when double-sided printing is performed, the target fixing temperature (tandem-outputting target fixing temperature) of the fixing section 122 of the first image forming apparatus 100 is managed to be lower than the fiducial temperature FT thereof, and by how many degrees the target fixing temperature of the fixing section 122 is decreased changes in accordance with the inside temperature of the second image forming apparatus 200.

Table 3 shows the target fixing temperatures of the first image forming apparatus 100 and the second image forming apparatus 200 for each paper type for when double-sided printing is performed (tandem-outputting target fixing temperature) in the second fixing temperature management processing.

TABLE 3

| Paper Type | Plain Paper | Thick Paper |
| --- | --- | --- |
| Apparatus 100 (Apparatus 200 Inside Temperature ≥ 34° C.) | 145° C (FT-15° C.) | 170° C. (FT-10° C.) |
| Apparatus 100 (Apparatus 200 Inside Temperature < 34° C.) | 150° C.(FT-10° C.) | 175° C. (FT-5° C.) |
| Apparatus 200 | 160° C. | 180° C. |

As shown in Table 3, when the paper type is plain paper, and the inside temperature of the second image forming apparatus 200 is 34° C. or more, the target fixing temperature of the first image forming apparatus 100 is decreased by 15° C. from the fiducial temperature FT thereof. When the paper type is plain paper, and the inside temperature of the second image forming apparatus 200 is less than 34° C., the target fixing temperature of the first image forming apparatus 100 is decreased by 10° C. from the fiducial temperature FT thereof. When the paper type is thick paper, and the inside temperature of the second image forming apparatus 200 is 34° C. or more, the target fixing temperature of the first image forming apparatus 100 is decreased by 10° C. from the fiducial temperature FT thereof. When the paper type is thick paper, and the inside temperature of the second image forming apparatus 200 is less than 34° C., the target fixing temperature of the first image forming apparatus 100 is decreased by 5° C. from the fiducial temperature FT thereof. As shown in Table 3, the target fixing temperature of the second image forming apparatus 200 is the same as the fiducial temperature FT thereof for each paper type.

In the embodiment, 34° C. is used as a threshold value of the inside temperature of the second image forming apparatus 200. For example, when the inside temperature of the second image forming apparatus 200 exceeds 34° C., a fan is driven for cooling. However, the threshold value of the inside temperature of the second image forming apparatus 200 is not limited to 34° C.

In the second fixing temperature management processing, the target fixing temperatures of the first image forming apparatus 100 and the second image forming apparatus 200 for when single-sided printing is performed are respectively the same as the fiducial temperatures FT thereof for each paper type.

In the first image forming apparatus 100, for example, input of a job for single-sided printing or a job for double-sided printing into the first image forming apparatus 100 triggers the second fixing temperature management processing. That is, when such a job is inputted, the control section 181 performs the second fixing temperature management processing in accordance with the second fixing temperature management program read from the storage section 182 and expanded in the RAM 183.

As shown in FIG. 4, Step S21 is the same as Step 11 of the first fixing temperature management processing shown in FIG. 3. When judging that double-sided printing is performed on a sheet on which printing is about to be performed (Step S21; YES), the control section 181 requests the second image forming apparatus 200 of inside temperature information so as to obtain the inside temperature information via the communication section 170, and judges whether or not the obtained inside temperature information indicates 34° C. or more (Step S22). At Step S22, in response to the request of the inside temperature information from the control section 181 via the communication section 270, the control section 281 of the second image forming apparatus 200 detects the inside temperature of the second image forming apparatus 200 with the temperature detection section 290, and transmits the inside temperature information on the detected inside temperature to the control section 181 via the communication 270. The control section 181 receives and obtains the inside temperature information on the detected inside temperature of the second image forming apparatus 200 from the second image forming apparatus 200 via the communication section 170.

When judging that the inside temperature information indicates 34° C. or more (Step S22; YES), the control section 181 refers to paper mode information of the job data, and judges what paper type the sheet is (Step S23). When judging that the paper type of the sheet is plain paper (Step S23; Plain Paper), the control section 181 sets the target fixing temperature of the fixing section 122 at 145° C. (Step S24). When judging that the paper type of the sheet is thick paper (Step S23; Thick Paper), the control section 181 sets the target fixing temperature of the fixing section 122 at 170° C. (Step S25). Step S26 is the same as Step S15 in the first fixing temperature management processing.

When judging that the inside temperature information indicates less than 34° C. (Step S22; NO), the control section 181 refers to the paper mode information of the job data, and judges what paper type the sheet is (Step S27). When judging that the paper type of the sheet is plain paper (Step S27; Plain Paper), the control section 181 sets the target fixing temperature of the fixing section 122 at 150° C. (Step S28), and moves to Step S26. When judging that the paper type of the sheet is thick paper (Step S27; Thick Paper), the control section 181 sets the target fixing temperature of the fixing section 122 at 175° C. (Step S29), and moves to Step S26.

When judging that single-sided printing is performed on the sheet (Step S21; NO), the control section 181 moves to Step S30. Steps S30 to S32 are the same as Steps S16 to S18 in the first fixing temperature management processing, respectively.

In response to the start of the second fixing temperature management processing, the control section 281 of the second image forming apparatus 200 sets the target fixing temperature of the fixing section 222 at the value of the fiducial temperature FT thereof for each paper type.

As described above, according to the present embodiment, in the case where the tandem outputting is performed, when the inside temperature of the second image forming apparatus 200, the inside temperature which is detected by the temperature detection section 290, is a predetermined degrees (34° C.), namely, a predetermined temperature, or more, the control section 181 of the first image forming apparatus 100 sets the target fixing temperature of the fixing section 122 at a value lower than a value thereof for when the detected inside temperature of the second image forming apparatus 200 is less than 34° C. Accordingly, the inside temperature of the second image forming apparatus 200 and the temperature of the fixing section 222 can be appropriately managed in accordance with the detected inside temperature of the second image forming apparatus 200, and prevented from going up too much.

Third Embodiment

Figure 5:
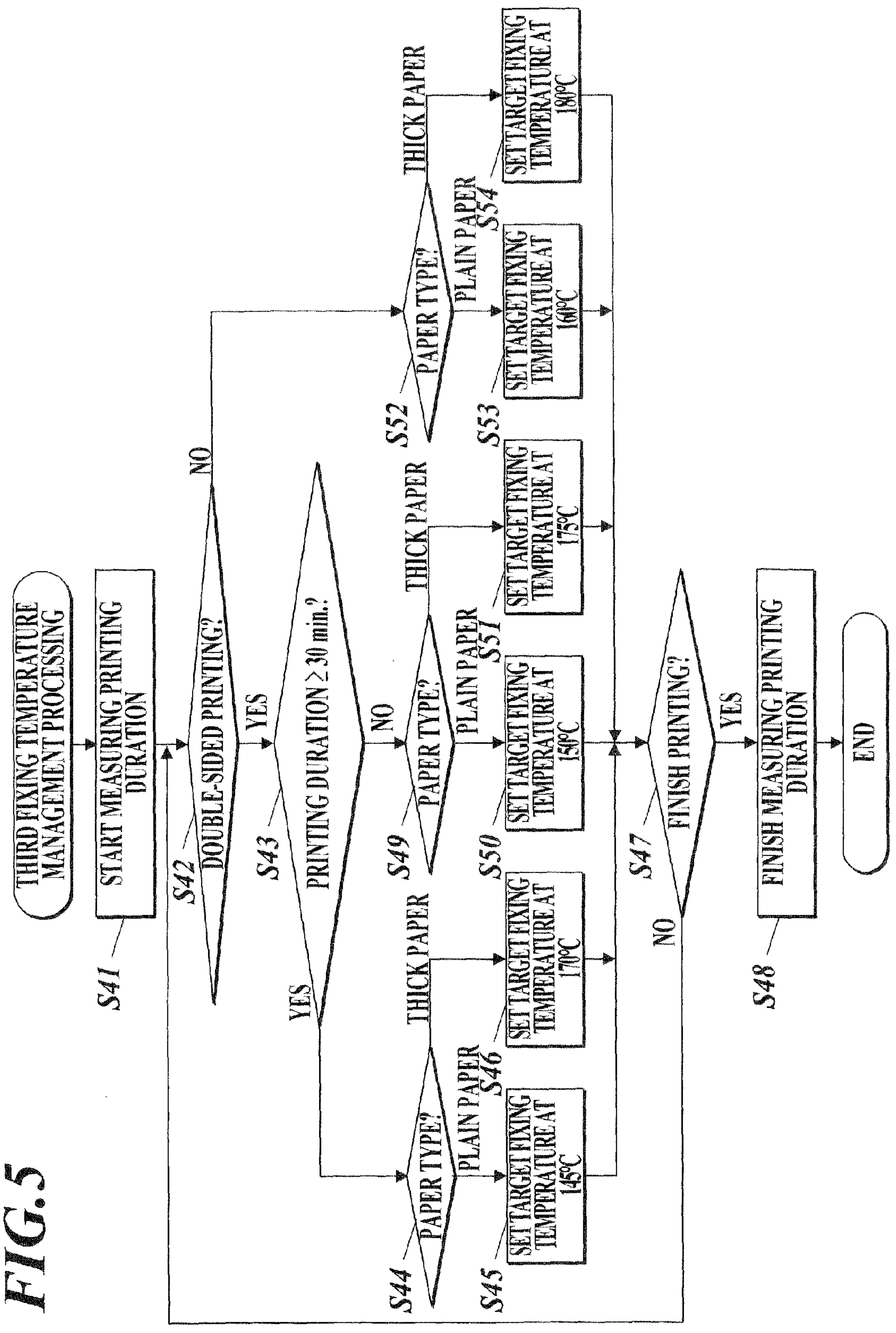
FIG. 5 is a flowchart of third fixing temperature management processing performed by the first image forming apparatus.

The third embodiment of the present invention is described with reference to FIG. 5. FIG. 5 shows third fixing temperature management processing performed by the first image forming apparatus 100.

In the third embodiment as well, the image forming system 1 is used. Therefore, in order to avoid repeating the same description, the description of the configurations of the apparatuses of the image forming system 1 is omitted. However, in the embodiment, a third fixing temperature management program is stored in the storage section 182 instead of the first fixing temperature management program.

Next, the operations of the image forming system 1 in the embodiment are described with reference to FIG. 5. The third fixing temperature management processing performed by the first image forming apparatus 100 is processing to manage the target fixing temperature of the fixing section 122 for when the printing is performed thereby. In the third fixing temperature management processing, when double-sided printing is performed, the target fixing temperature (tandem-outputting target fixing temperature) of the fixing section 122 of the first image forming apparatus 100 is managed to be lower than the fiducial temperature FT thereof, and by how many degrees the target fixing temperature of the fixing section 122 is decreased changes in accordance with a printing duration during which double-sided printing (tandem outputting) continues.

Table 4 shows the target fixing temperatures of the first image forming apparatus 100 and the second image forming apparatus 200 for each paper type for when double-sided printing is performed (tandem-outputting target fixing temperature) in the third fixing temperature management processing.

TABLE 4

| Paper Type | Plain Paper | Thick Paper |
|---|---|---|
| Apparatus 100 (Printing Duration ≥ 30 min.) | 145° C. (FT-15° C.) | 170° C. (FT-10° C.) |
| Apparatus 100 (Printing Duration < 30 min.) | 150° C. (FT-10° C.) | 175° C. (FT-5° C.) |
| Apparatus 200 | 160° C. | 180° C. |

As shown in Table 4, when the paper type is plain paper, and the printing duration is 30 minutes or more, the target fixing temperature of the first image forming apparatus 100 is decreased by 15° C. from the fiducial temperature FT thereof. When the paper type is plain paper, and the printing duration is less than 30 minutes, the target fixing temperature of the first image forming apparatus 100 is decreased by 10° C. from the fiducial temperature FT thereof. When the paper type is thick paper, and the printing duration is 30 minutes or more, the target fixing temperature of the first image forming apparatus 100 is decreased by 10° C. from the fiducial temperature FT thereof. When the paper type is thick paper, and the printing duration is less than 30 minutes, the target fixing temperature of the first image forming apparatus 100 is decreased by 5° C. from the fiducial temperature FT thereof. As shown in Table 4, the target fixing temperature of the second image forming apparatus 200 is the same as the fiducial temperature FT thereof for each paper type. Note that the threshold value of the printing duration is not limited to 30 minutes.

In the third fixing temperature management processing, the target fixing temperatures of the first image forming apparatus 100 and the second image forming apparatus 200 for when single-sided printing is performed are respectively the same as the fiducial temperatures FT thereof for each paper type.

In the first image forming apparatus 100, for example, input of a job for single-sided printing or a job for double-sided printing into the first image forming apparatus 100 triggers the third fixing temperature management processing. That is, when such a job is inputted, the control section 181 performs the third fixing temperature management processing in accordance with the third fixing temperature management program read from the storage section 182 and expanded in the RAM 183.

As shown in FIG. 5, the control section 181 starts measuring the printing duration for the inputted job in response to time information from the timing section 181*a* (Step S41), and moves to Step S42. Step S42 is the same as Step S11 in the first fixing temperature management processing shown in FIG. 3.

When judging that double-sided printing is performed on a sheet on which printing is about to be performed (Step S42; YES), the control section 181 judges whether or not the measured printing duration so far is 30 minutes or more (Step S43). When judging that the measured printing duration so far is 30 minutes or more (Step S43; YES), the control section 181 moves to Step S44. Steps S44 to S47 are the same as Steps S23 to S26 in the second fixing temperature management processing shown in FIG. 4, respectively.

When judging that the printing is not finished (Step S47; NO), the control section moves to Step S42. When judging that the printing is finished (Step S47; YES), the control section 181 finishes measuring the printing duration for the inputted job (Step S48).

When judging that the measured printing duration so far is less than 30 minutes (Step S43; NO), the control section 181 moves to Step S49. Steps S49 to S54 are the same as Steps S27 to S32 in the second fixing temperature management processing, respectively.

In response to the start of the third fixing temperature management processing, the control section 281 of the second image forming apparatus 200 sets the target fixing temperature of the fixing section 222 at the value of the fiducial temperature FT thereof for each paper type.

As described above, according to the present embodiment, in the case where the tandem outputting is performed, when the measured printing duration is a predetermined duration (30 minutes) or more, the control section 181 sets the target fixing temperature of the fixing section 122 at a value lower than a value thereof for when the measured printing duration is less than the predetermined time. Accordingly, the inside temperature of the second image forming apparatus 200 and the temperature of the fixing section 222 can be appropriately managed in accordance with the measured printing duration, and prevented from going up too much.

Fourth Embodiment

Figure 6:
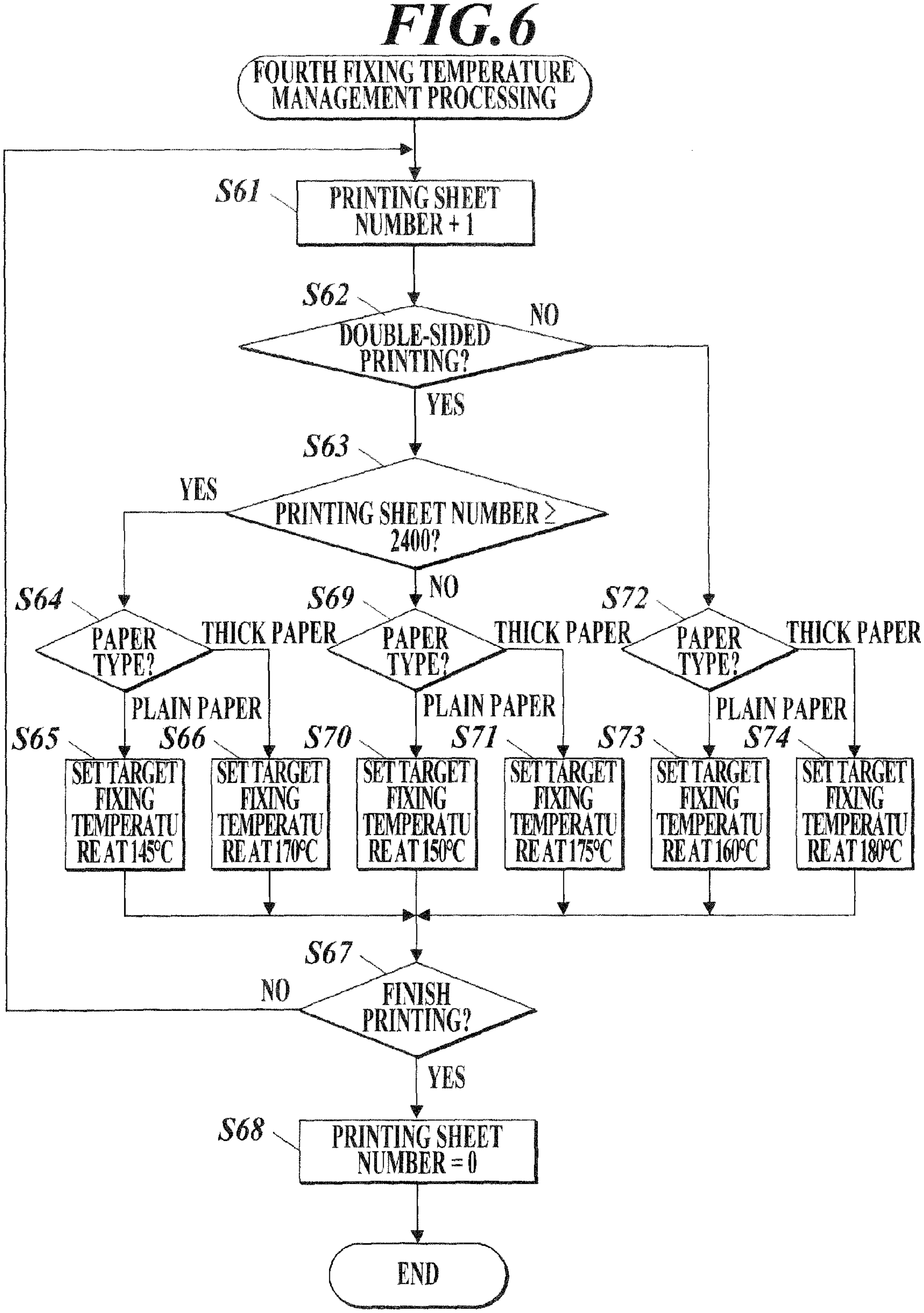
FIG. 6 is a flowchart of fourth fixing temperature management processing performed by the first image forming apparatus.

The fourth embodiment of the present invention is described with reference to FIG. 6. FIG. 6 shows fourth fixing temperature management processing performed by the first image forming apparatus 100.

In the fourth embodiment as well, the image forming system 1 is used. Therefore, in order to avoid repeating the same description, the description of the configurations of the apparatuses of the image forming system 1 is omitted. However, in the embodiment, a fourth fixing temperature management program is stored in the storage section 182 instead of the first fixing temperature management program.

Next, the operations of the image forming system 1 in the embodiment are described with reference to FIG. 6. The fourth fixing temperature management processing performed by the first image forming apparatus 100 is processing to manage the target fixing temperature of the fixing section 122 for when the printing is performed thereby. In the fourth fixing temperature management processing, when double-sided printing is performed, the target fixing temperature (tandem-outputting target fixing temperature) of the fixing section 122 of the first image forming apparatus 100 is managed to be lower than the fiducial temperature FT thereof, and by how many degrees the target fixing temperature of the fixing section 122 is decreased changes in accordance with the number of sheets on which double-sided printing (tandem outputting) is continuously performed (printing sheet number).

Table 5 shows the target fixing temperatures of the first image forming apparatus 100 and the second image forming apparatus 200 for each paper type for when double-sided printing is performed (tandem-outputting target fixing temperature) in the fourth fixing temperature management processing.

TABLE 5

| Paper Type | Plain Paper | Thick Paper |
|---|---|---|
| Apparatus 100 (Printing Sheet Number ≥ 2400 sheets) | 145° C. (FT-15° C.) | 170° C. (FT-10° C.) |
| Apparatus 100 (Printing Sheet Number < 2400 sheets) | 150° C. (FT-10° C.) | 175° C. (FT-5° C.) |
| Apparatus 200 | 160° C. | 180° C. |

As shown in Table 5, when the paper type is plain paper, and the printing sheet number is 2400 sheets or more, the target fixing temperature of the first image forming apparatus 100 is decreased by 15° C. from the fiducial temperature FT thereof. When the paper type is plain paper, and the printing sheet number is less than 2400 sheets, the target fixing temperature of the first image forming apparatus 100 is decreased by 10° C. from the fiducial temperature FT thereof. When the paper type is thick paper, and the printing sheet number is 2400 sheets or more, the target fixing temperature of the first image forming apparatus 100 is decreased by 10° C. from the fiducial temperature FT thereof. When the paper type is thick paper, and the printing sheet number is less than 2400 sheets, the target fixing temperature of the first image forming apparatus 100 is decreased by 5° C. from the fiducial temperature FT thereof. As shown in Table 5, the target fixing temperature of the second image forming apparatus 200 is the same as the fiducial temperature FT thereof for each paper type.

In the embodiment, 2400 sheets are used as a threshold value of the printing sheet number. This is the value obtained when an image forming apparatus performs printing at the print speed of 80 sheets per minute for 30 minutes. However, the threshold value of the printing sheet number is not limited to 2400 sheets.

In the fourth fixing temperature management processing, the target fixing temperatures of the first image forming apparatus 100 and the second image forming apparatus 200 for when single-sided printing is performed are respectively the same as the fiducial temperatures FT thereof for each paper type.

In the first image forming apparatus 100, for example, input of a job for single-sided printing or a job for double-sided printing into the first image forming apparatus 100 triggers the fourth fixing temperature management processing. That is, when such a job is inputted, the control section 181 performs the fourth fixing temperature management processing in accordance with the fourth fixing temperature management program read from the storage section 182 and expanded in the RAM 183.

As shown in FIG. 6, the control section 181 increases a value of the printing sheet number by "1" (Step S61), and moves to Step S62. The printing sheet number indicates on how many sheets printing is continuously performed for the inputted job. Note that a default value of the printing sheet number is "0". Step S62 is the same as Step S11 in the first fixing temperature management processing.

When judging that double-sided printing is performed on a sheet on which printing is about to be performed (Step S62; YES), the control section 181 judges whether or not the counted printing sheet number so far is 2400 sheets or more (Step S63). When judging that the counted printing sheet number so far is 2400 sheets or more (Step S63; YES), the control section 181 moves to Step S64. Steps S64 to S67 are the same as Steps S23 to S26 in the second fixing temperature management processing, respectively.

When judging that the printing is not finished (Step S67; NO), the control section 181 moves to Step S61. When judging that the printing is finished (Step S67; YES), the control section 181 assigns "0" to the printing sheet number (Step S68), and ends the fourth fixing temperature management processing.

When judging that the counted printing sheet number so far is less than 2400 sheets (Step S63; NO), the control section 181 moves to Step S69. Steps S69 to S74 are the same as Steps S27 to S32 in the second fixing temperature management processing, respectively.

In response to the start of the fourth fixing temperature management processing, the control section 281 of the second image forming apparatus 200 sets the target fixing temperature of the fixing section 222 at the value of the fiducial temperature FT thereof for each paper type.

As described above, according to the present embodiment, in the case where the tandem outputting is performed, when the counted printing sheet number is a predetermined number (2400 sheets) or more, the control section 181 sets the target fixing temperature of the fixing section 122 at a value lower than a value thereof for when the counted printing sheet number is less than the predetermined number. Accordingly, the inside temperature of the second image forming apparatus 200 and the temperature of the fixing section 222 can be appropriately managed in accordance with the counted printing sheet number, and prevented from going up too much.

Fifth Embodiment

Figure 7:
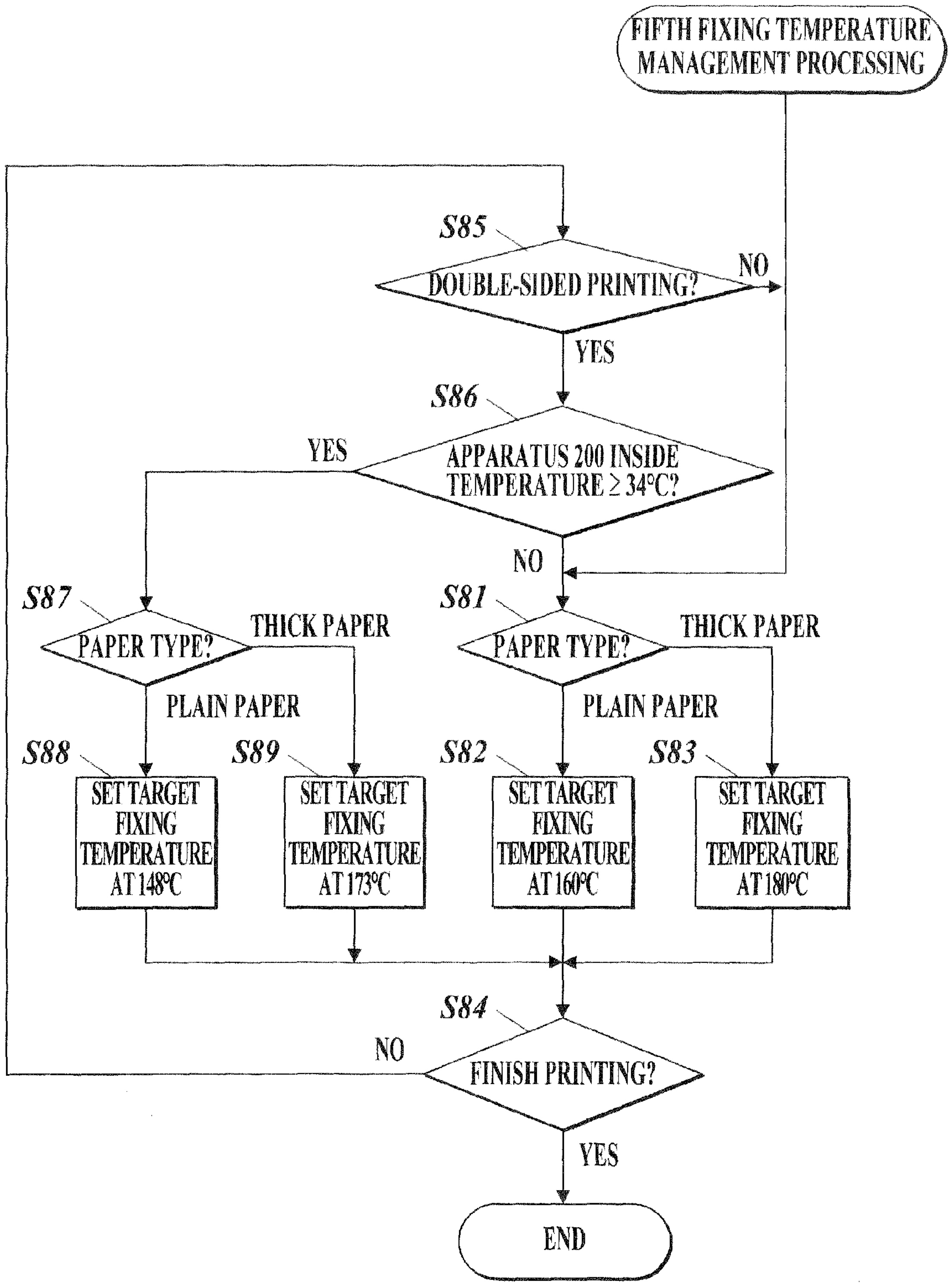
FIG. 7 is a flowchart of fifth fixing temperature management processing performed by the first image forming apparatus.

The fifth embodiment of the present invention is described with reference to FIG. 7. FIG. 7 shows fifth fixing temperature management processing performed by the first image forming apparatus 100.

In the fifth embodiment as well, the image forming system 1 is used. Therefore, in order to avoid repeating the same description, the description of the configurations of the apparatuses of the image forming system 1 is omitted. However, in the embodiment, a fifth fixing temperature management program is stored in the storage section 182 instead of the first fixing temperature management program.

Next, the operations of the image forming system 1 in the embodiment are described with reference to FIG. 7. The fifth fixing temperature management processing performed by the first image forming apparatus 100 is processing to manage the target fixing temperature of the fixing section 122 for when the printing is performed thereby. In the fifth fixing temperature management processing, for a sheet on which printing is performed first, namely, the first sheet of an inputted job, the target fixing temperature (tandem-outputting target fixing temperature) of the fixing section 122 of the first image forming apparatus 100 is managed to be equal to the fiducial temperature FT thereof, and for the other sheets, namely, the second sheet and the rest of the sheets of the inputted job, the target fixing temperature (tandem-outputting target fixing temperature) of the fixing section 122 of the first image forming apparatus 100 is managed to be lower than the fiducial temperature FT thereof, and by how many degrees the target fixing temperature of the fixing section 122 is decreased changes in accordance with the inside temperature of the second image forming apparatus 200.

Table 6 shows the target fixing temperatures of the first image forming apparatus 100 and the second image forming apparatus 200 for each paper type for when double-sided printing is being performed (tandem-outputting target fixing temperature) in the fifth fixing temperature management processing.

TABLE 6

| Paper Type | Plain Paper | Thick Paper |
|---|---|---|
| Apparatus 100 (Apparatus 200 Inside Temperature ≥ 34° C.) | 148° C. (FT-12° C.) | 173° C. (FT-7° C.) |
| Apparatus 100 (Apparatus 200 Inside Temperature < 34° C.) | 160° C. | 180° C. |
| Apparatus 200 | 160° C. | 180° C. |

As shown in Table 6, when the paper type is plain paper, and the inside temperature of the second image forming apparatus 200 is 34° C. or more, the target fixing temperature of the first image forming apparatus 100 is decreased by 12° C. from the fiducial temperature FT thereof. When the paper type is plain paper, and the inside temperature of the second image forming apparatus 200 is less than 34° C., the target fixing temperature of the first image forming apparatus 100 is the same as the fiducial temperature FT thereof. When the paper type is thick paper, and the inside temperature of the second image forming apparatus 200 is 34° C. or more, the target fixing temperature of the first image forming apparatus 100 is decreased by 7° C. from the fiducial temperature FT thereof. When the paper type is thick paper, and the inside temperature of the second image forming apparatus 200 is less than 34° C., the target fixing temperature of the first image forming apparatus 100 is the same as the fiducial temperature FT thereof. As shown in Table 6, the target fixing temperature of the second image forming apparatus 200 is the same as the fiducial temperature FT thereof for each paper type.

In the fifth fixing temperature management processing, the target fixing temperatures of the first image forming apparatus 100 and the second image forming apparatus 200 for when single-sided printing is performed are respectively the same as the fiducial temperatures FT thereof for each paper type.

In the first image forming apparatus 100, for example, input of a job for single-sided printing or a job for double-sided printing into the first image forming apparatus 100 triggers the fifth fixing temperature management processing. That is, when such a job is inputted, the control section 181 performs the fifth fixing temperature management processing in accordance with the fifth fixing temperature management program read from the storage section 182 and expanded in the RAM 183.

As shown in FIG. 7, Steps S81, S82, S83, and S84 are the same as Steps S16, S17, S18, and S15 in the first fixing temperature management processing shown in FIG. 3, respectively. When judging that the printing is not finished (Step S84; NO), the control section 181 moves to Step S85. Step S85 is the same as Step S11 in the first fixing temperature management processing. When judging that double-sided printing is performed on a sheet on which printing is performed next (Step S85; YES), the control section 181 moves to Step S86. When judging that double-sided printing is not performed on the sheet (Step S85; NO), the control section 181 moves to Step S81.

Steps S86 and S87 are the same as Steps S22 and S23 in the second fixing temperature management processing, respectively. When judging that the inside temperature of the second image forming apparatus 200 is less than 34° C. (Step S86; NO), the control section 181 moves to Step S81. When judging that the paper type is plain paper (Step S87; Plain Paper), the control section 181 sets the target fixing temperature of the fixing section 122 at 148° C. (Step S88), and moves to Step S84. When judging that the paper type is thick paper (Step S87; Thick Paper), the control section 181 sets the target fixing temperature of the fixing section 122 at 173° C. (Step S89), and moves to Step S84.

In response to the start of the fifth fixing temperature management processing, the control section 281 of the second image forming apparatus 200 sets the target fixing temperature of the fixing section 222 at the value of the fiducial temperature FT thereof for each paper type.

As described above, according to the present embodiment, in the case where the tandem outputting is performed, the control section 181 of the first image forming apparatus 100 sets, for the first sheet of a job, the target fixing temperature of the fixing section 122 at the value of the fiducial temperature FT thereof. Therefore, in addition to the inside temperature of the second image forming apparatus 200 and the temperature of the fixing section 222 being appropriately managed, and prevented from going up too much, images formed on the first sheet and the rest of the sheets of the job can be prevented from becoming grainy, which is caused at the time of image fixation, and the quality of the images can be increased, accordingly. It is because the target fixing temperature of the fixing section 122 for the first sheet of a job is set at a value higher than values thereof for the other sheets, namely, the target fixing temperature of the fixing section 122 can be set at a lower value after the fixing section 122 is heated.

Sixth Embodiment

Figure 8:
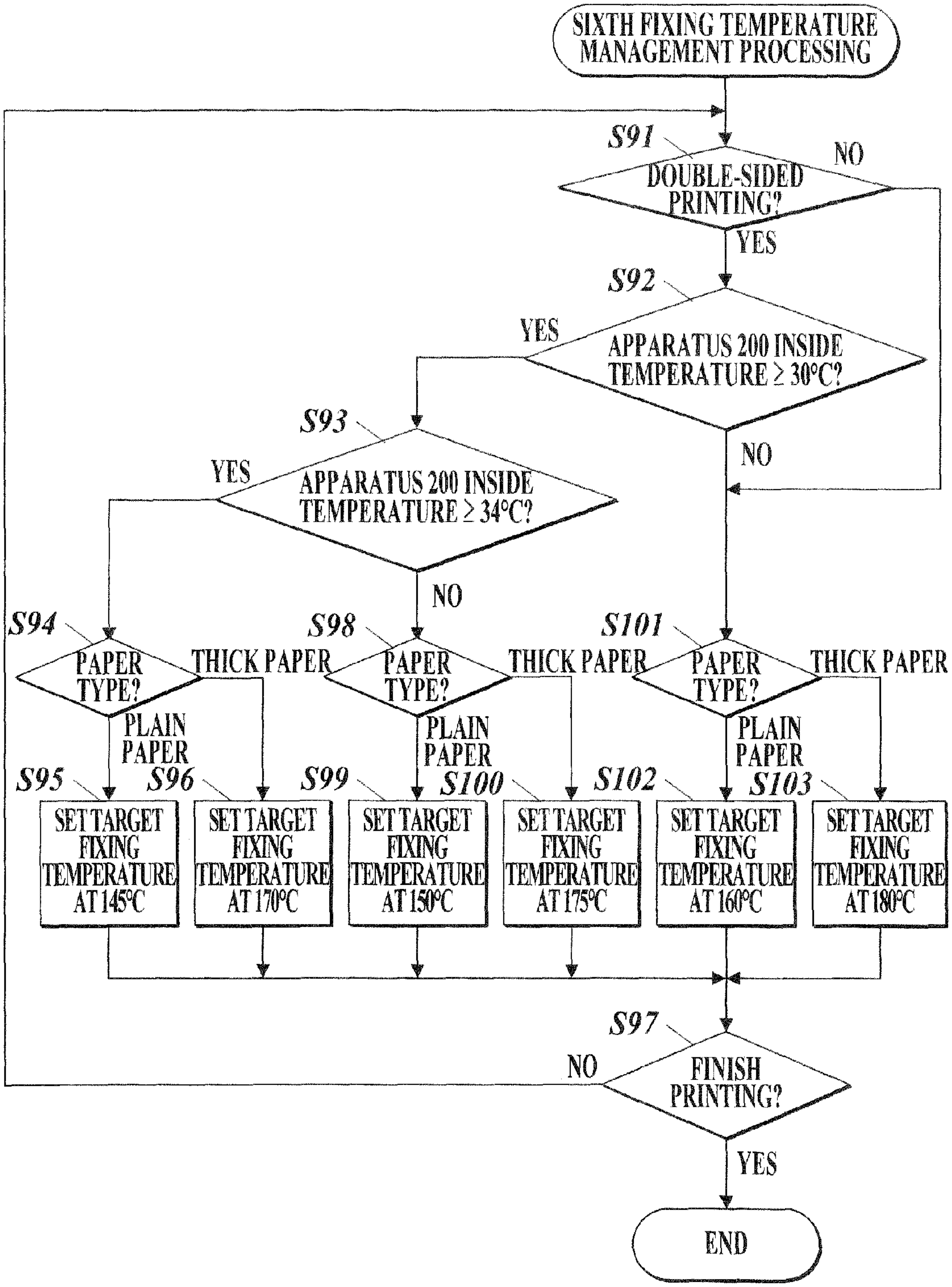
FIG. 8 is a flowchart of sixth fixing temperature management processing performed by the first image forming apparatus.

The sixth embodiment of the present invention is described with reference to FIG. 8. FIG. 8 shows sixth fixing temperature management processing performed by the first image forming apparatus 100.

In the sixth embodiment as well, the image forming system 1 is used. Therefore, in order to avoid repeating the same description, the description of the configurations of the apparatuses of the image forming system 1 is omitted. However, in the embodiment, a sixth fixing temperature management program is stored in the storage section 182 instead of the first fixing temperature management program.

Next, the operations of the image forming system 1 in the embodiment are described with reference to FIG. 8. The sixth fixing temperature management processing performed by the first image forming apparatus 100 is processing to manage the target fixing temperature of the fixing section 122 for when the printing is performed thereby. In the sixth fixing temperature management processing, when double-sided printing is performed, the target fixing temperature (tandem-outputting target fixing temperature) of the fixing section 122 of the first image forming apparatus 100 is managed to be lower than the fiducial temperature FT thereof, and by how many degrees the target fixing temperature of the fixing section 122 is decreased changes in accordance with the inside temperature of the second image forming apparatus 200. There are two steps for decreasing the target fixing temperature of the fixing section 122 in the sixth fixing temperature management processing.

Table 7 shows the target fixing temperatures of the first image forming apparatus 100 and the second image forming apparatus 200 for each paper type for when double-sided printing is performed (tandem-outputting target fixing temperature) in the sixth fixing temperature management processing.

TABLE 7

| Paper Type | Plain Paper | Thick Paper |
|---|---|---|
| Apparatus 100 (Apparatus 200 Inside Temperature ≥ 34° C.) | 145° C. (FT-15° C.) | 170° C. (FT-10° C.) |
| Apparatus 100 (30° C. ≤ Apparatus 200 Inside Temperature < 34° C.) | 150° C. (FT-10° C.) | 175° C. (FT-5° C.) |
| Apparatus 100 (Apparatus 200 Inside Temperature < 30° C.) | 160° C. | 180° C. |
| Apparatus 200 | 160° C. | 180° C. |

As shown in Table 7, when the paper type is plain paper, and the inside temperature of the second image forming apparatus 200 is 34° C. or more, the target fixing temperature of the first image forming apparatus 100 is decreased by 15° C. from the fiducial temperature FT thereof. When the paper type is plain paper, and the inside temperature of the second image forming apparatus 200 is 30° C. or more, but less than 34° C., the target fixing temperature of the first image forming apparatus 100 is decreased by 10° C. from the fiducial temperature FT thereof. When the paper type is plain paper, and the inside temperature of the second image forming apparatus 200 is less than 30° C., the target fixing temperature of the first image forming apparatus 100 is the same as the fiducial temperature FT thereof. When the paper type is thick paper, and the inside temperature of the second image forming apparatus 200 is 34° C. or more, the target fixing temperature of the first image forming apparatus 100 is decreased by 10° C. from the fiducial temperature FT thereof. When the paper type is thick paper, and the inside temperature of the second image forming apparatus 200 is 30° C. or more, but less than 34° C., the target fixing temperature of the first image forming apparatus 100 is decreased by 5° C. from the fiducial temperature FT thereof. When the paper type is thick paper, and the inside temperature of the second image forming apparatus 200 is less than 30° C., the target fixing temperature of the first image forming apparatus 100 is the same as the fiducial temperature FT thereof. As shown in Table 7, the target fixing temperature of the second image forming apparatus 200 is the same as the fiducial temperature FT thereof for each paper type. In the present invention, 30° C. and 34° C. are used as threshold values of the inside temperature of the second image forming apparatus 200. However, this is not a limit.

In the sixth fixing temperature management processing, the target fixing temperatures of the first image forming apparatus 100 and the second image forming apparatus 200 for when single-sided printing is performed are respectively the same as the fiducial temperatures FT thereof for each paper type.

In the first image forming apparatus 100, for example, input of a job for single-sided printing or a job for double-sided printing into the first image forming apparatus 100 triggers the sixth fixing temperature management processing. That is, when such a job is inputted, the control section 181 performs the sixth fixing temperature management processing in accordance with the sixth fixing temperature management program read from the storage section 182 and expanded in the RAM 183.

As shown in FIG. 8, Step S91 is the same as Step S11 in the first fixing temperature management processing shown in FIG. 3. When judging that double-sided printing is performed on a sheet on which printing is about to be performed (Step S91; YES), the control section 181 requests the second image forming apparatus 200 of inside temperature information so as to obtain the inside temperature information via the communication section 170, and judges whether or not the obtained inside temperature information indicates 30° C. or more (Step S92). When judging that the inside temperature information indicates 30° C. or more (Step S92; YES), the control section 181 moves to Step S93. Steps S93 to S100 are the same as Steps S22 to S29 in the second fixing temperature management processing shown in FIG. 4, respectively.

When judging that single-sided printing is performed on the sheet (Step S91; NO), or that the inside temperature information indicates less than 30° C. (Step S92; NO), the control section 181 moves to Step S101. Steps S101 to S103 are the same as Steps S16 to S18 in the first fixing temperature management processing, respectively.

In response to the start of the sixth fixing temperature management processing, the control section 281 of the second image forming apparatus 200 sets the target fixing temperature of the fixing section 222 at the value of the fiducial temperature FT thereof for each paper type.

As described above, according to the present embodiment, three values of a temperature (three temperatures) are set for the target fixing temperature of the fixing section 122, and in the case where the tandem outputting is performed, as the inside temperature of the second image forming apparatus 200 detected by the temperature detection section 290 becomes higher, the control section 181 of the first image forming apparatus 100 sets the target fixing temperature of the fixing section 122 at a lower value. Accordingly, the inside temperature of the second image forming apparatus 200 and the temperature of the fixing section 222 can be more appropriately managed in accordance with the detected inside temperature of the second image forming apparatus 200, and prevented from going up too much. In the present embodiment, the number of the values thereof set for the target fixing temperature of the fixing section 122 is three. However, this is not a limit. The number thereof may be four or more.

Seventh Embodiment

Figure 9:
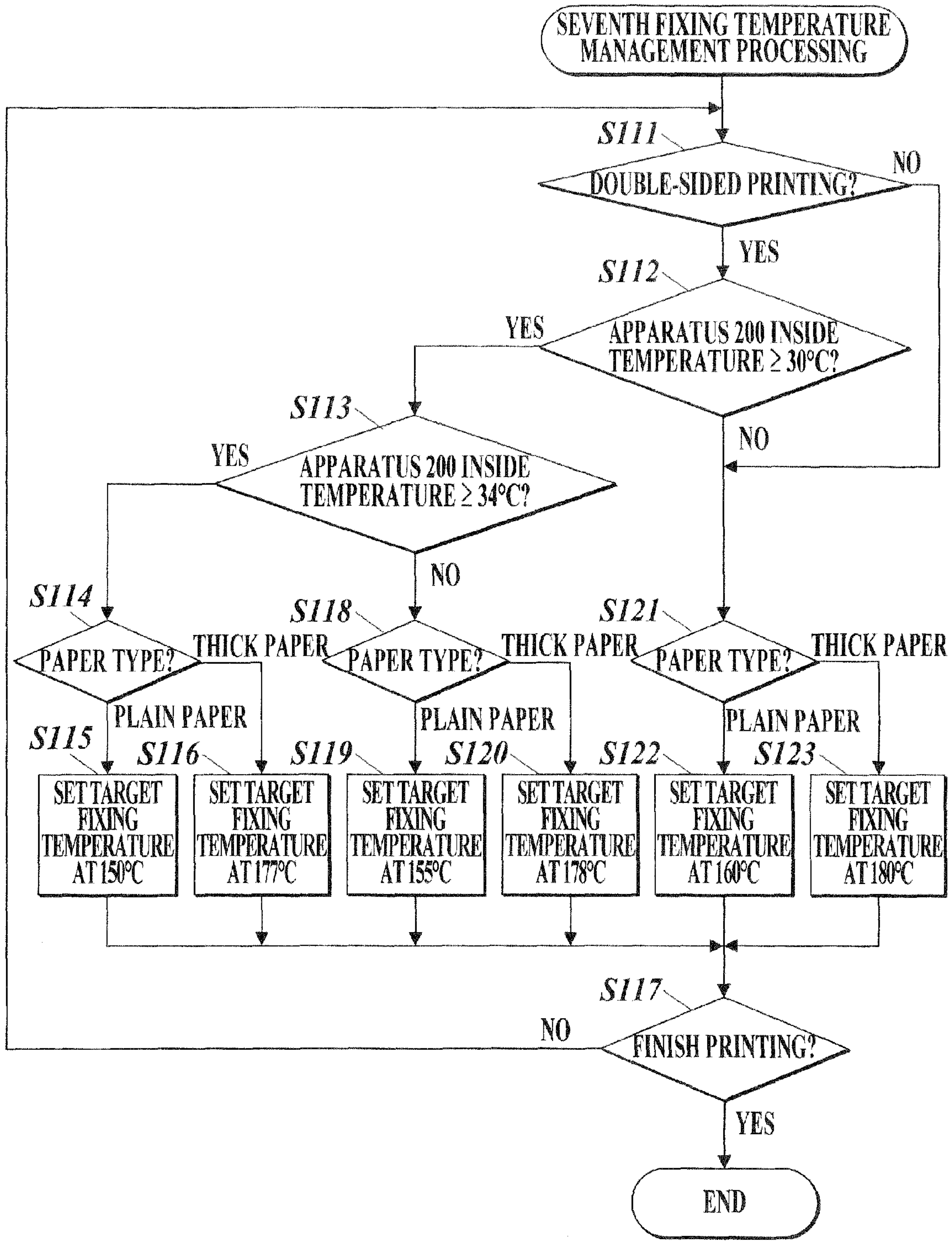
FIG. 9 is a flowchart of seventh fixing temperature management processing performed by the first image forming apparatus.
Figure 10:
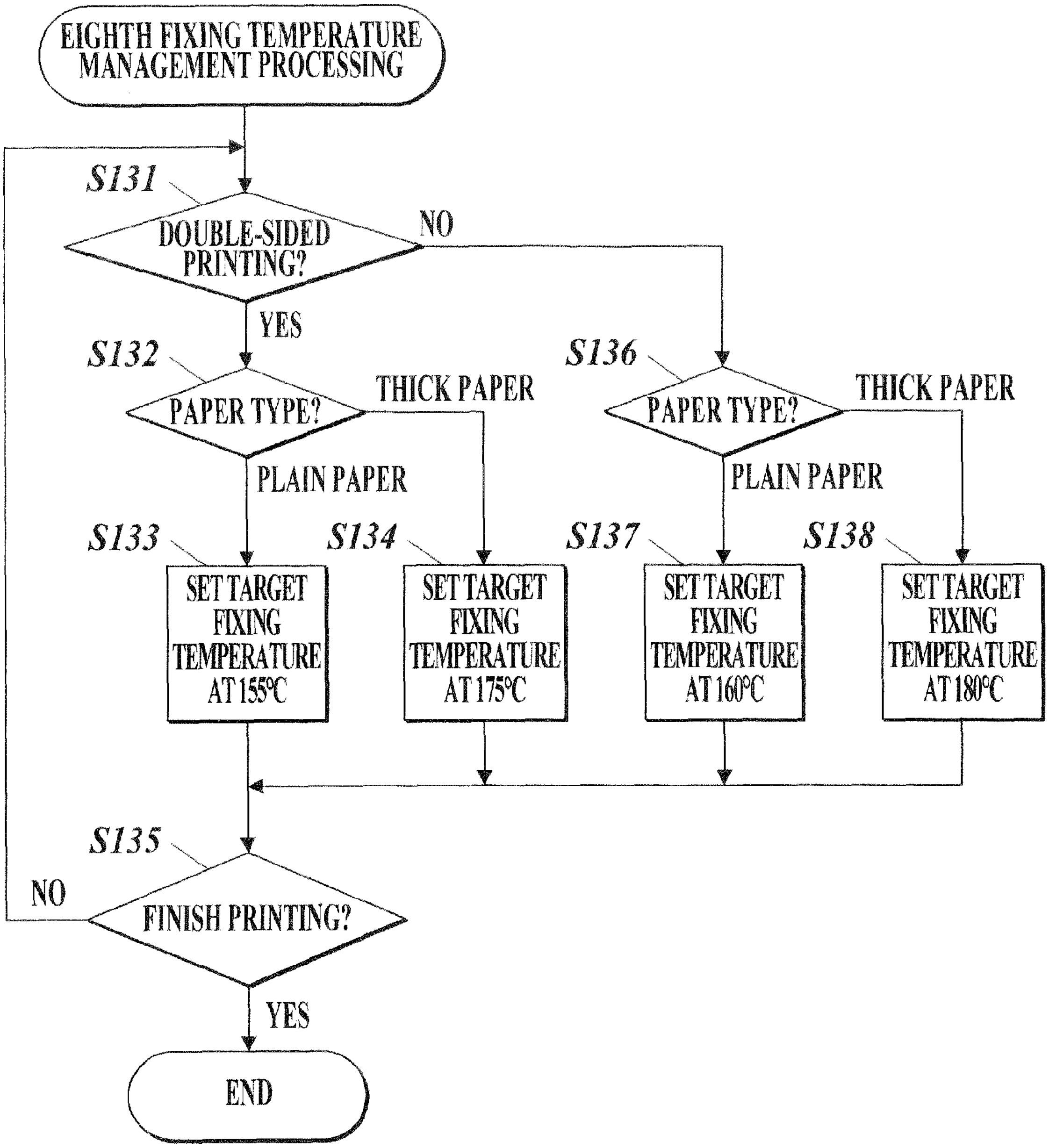
FIG. 10 is a flowchart of eight fixing temperature management processing performed by a second image forming apparatus of the image forming system.

The seventh embodiment of the present invention is described with reference to FIGS. 9 and 10. FIG. 9 shows seventh fixing temperature management processing performed by the first image forming apparatus 100, and FIG. 10 shows eighth fixing temperature management processing performed by the second image forming apparatus 200.

In the seventh embodiment as well, the image forming system 1 is used. Therefore, in order to avoid repeating the same description, the description of the configurations of the apparatuses of the image forming system 1 is omitted. However, in the embodiment, a seventh fixing temperature management program is stored in the storage section 182 instead of the first fixing temperature management program, and also an eighth fixing temperature management program is stored in the storage section 282.

Next, the operations of the image forming system 1 in the embodiment are described with reference to FIGS. 9 and 10. The seventh fixing temperature management processing and the eighth fixing temperature management processing are described in the order named.

The seventh fixing temperature management processing performed by the first image forming apparatus 100 is processing to manage the target fixing temperature of the fixing section 122 for when the printing is performed thereby. In the seventh fixing temperature management processing, when double-sided printing (tandem outputting) is performed, the target fixing temperature (tandem-outputting target fixing temperature) of the fixing section 122 of the first image forming apparatus 100 is managed to be lower than the fiducial temperature FT thereof, and by how many degrees the target fixing temperature of the fixing section 122 is decreased changes in accordance with the inside temperature of the second image forming apparatus 200.

Table 8 shows the target fixing temperatures of the first image forming apparatus 100 and the second image forming apparatus 200 for each paper type for when single-sided printing is performed (single-sided-printing target fixing temperature ST) in the seventh embodiment.

TABLE 8

| Paper Type | Plain Paper | Thick Paper |
|---|---|---|
| Apparatus 100 | 160° C. | 180° C. |
| Apparatus 200 | 160° C. | 180° C. |

As shown in Table 8, the target fixing temperatures of the first image forming apparatus 100 and the second image forming apparatus 200 for when single-sided printing is performed in the seventh embodiment are respectively the same as the fiducial temperatures FT thereof for each paper type.

Table 9 shows the target fixing temperatures of the first image forming apparatus 100 and the second image forming apparatus 200 for each paper type for when double-sided printing is performed (tandem-outputting target fixing temperature) in the seventh embodiment.

TABLE 9

| Paper Type | Plain Paper | Thick Paper |
|---|---|---|
| Apparatus 100 (Apparatus 200 Inside Temperature ≥ 34° C.) | 150° C. (FT-10° C.) | 177° C. (FT-3° C.) |
| Apparatus 100 (30° C. ≤ Apparatus 200 Inside Temperature < 34° C.) | 155° C. (FT-5° C.) | 178° C. (FT-2° C.) |
| Apparatus 100 (Apparatus 200 Inside Temperature < 30° C.) | 160° C. | 180° C. |
| Apparatus 200 | 155° C. (ST-5° C.) | 175° C. (ST-5° C.) |

As shown in Table 9, when the paper type is plain paper, and the inside temperature of the second image forming apparatus 200 is 34° C. or more, the target fixing temperature of the first image forming apparatus 100 is decreased by 10° C. from the fiducial temperature FT thereof. When the paper type is plain paper, and the inside temperature of the second image forming apparatus 200 is 30° C. or more, but less than 34° C., the target fixing temperature of the first image forming apparatus 100 is decreased by 5° C. from the fiducial temperature FT thereof. When the paper type is plain paper, and the inside temperature of the second image forming apparatus 200 is less than 30° C., the target fixing temperature of the first image forming apparatus 100 is the same as the fiducial temperature FT thereof. When the paper type is thick paper, and the inside temperature of the second image forming apparatus 200 is 34° C. or more, the target fixing temperature of the first image forming apparatus 100 is decreased by 3° C. from the fiducial temperature FT thereof. When the paper type is thick paper, and the inside temperature of the second image forming apparatus 200 is 30° C. or more, but less than 34° C., the target fixing temperature of the first image forming apparatus 100 is decreased by 2° C. from the fiducial temperature FT thereof. When the paper type is thick paper, and the inside temperature of the second image forming apparatus 200 is less than 30° C., the target fixing temperature of the first image forming apparatus 100 is the same as the fiducial temperature FT thereof.

When the paper type is plain paper, and double-sided printing is performed, the target fixing temperature of the second image forming apparatus 200 is decreased by 5° C. from the target fixing temperature of the second image forming apparatus 200 for when the paper type is plain paper and single-sided printing is performed, namely, from the fiducial temperature FT thereof. When the paper type is thick paper, and double-sided printing is performed, the target fixing temperature of the second image forming apparatus 200 is decreased by 5° C. from the target fixing temperature of the second image forming apparatus 200 for when the paper type is thick paper and single-sided printing is performed, namely, from the fiducial temperature FT thereof.

In the first image forming apparatus 100, for example, input of a job for single-sided printing or a job for double-sided printing into the first image forming apparatus 100 triggers the seventh fixing temperature management processing. That is, when such a job is inputted, the control section 181 performs the seventh fixing temperature management processing in accordance with the seventh fixing temperature management program read from the storage section 182 and expanded in the RAM 183.

As shown in FIG. 9, Steps S111 to S114 are the same as Steps S91 to S94 in the sixth fixing temperature management processing shown in FIG. 8, respectively. When judging that the paper type is plain paper (Step S114; Plain Paper), the control section 181 sets the target fixing temperature of the fixing section 122 at 150° C. (Step S115), and moves to Step S117. When judging that the paper type is thick paper (Step S114; Thick Paper), the control section 181 sets the target fixing temperature of the fixing section 122 at 177° C. (Step S116), and moves to Step S117.

Steps S117 and S118 are the same as Steps S97 and S98 in the sixth fixing temperature management processing, respectively. When judging that the paper type is plain paper (Step S118; Plain Paper), the control section 181 sets the target fixing temperature of the fixing section 122 at 155° C. (Step S119), and moves to Step S117. When judging that the paper type is thick paper (Step S118; Thick Paper), the control section 181 sets the target fixing temperature of the fixing section 122 at 178° C. (Step S120), and moves to Step S117. Steps S121 to S123 are the same as Steps S16 to S18 in the first fixing temperature management processing, respectively.

The eighth fixing temperature management processing performed by the second image forming apparatus 200 is processing to manage the target fixing temperature of the fixing section 222 for when the printing is performed thereby. In the eighth fixing temperature management processing, when double-sided printing (tandem outputting) is performed, the target fixing temperature (tandem-outputting target fixing temperature) of the fixing section 222 of the second image forming apparatus 200 is managed to be lower than the target fixing temperature of the fixing section 222 thereof for when single-sided printing is performed, namely, the fiducial temperature FT thereof.

In the second image forming apparatus 200, for example, input of a job for single-sided printing or a job for double-sided printing into the second image forming apparatus 200 triggers the eighth fixing temperature management processing. That is, when such a job is inputted, the control section 281 performs the eighth temperature management processing in accordance with the eighth fixing temperature management program read from the storage section 282 and expanded in the RAM 283. Otherwise, the control section 181 of the first image forming apparatus 100 transmits, when such a job is inputted therein, job data thereof to the second image forming apparatus 200 via the communication section 170, and the control section 281 of the second image forming apparatus 200 receives the job data from the first image forming apparatus 100 via the communication section 270.

As shown in FIG. 10, the control section 281 first refers to paper mode information of the job data, and then judges which of single-sided printing and double-sided printing is performed on a sheet on which printing is about to be performed (Step S131). When judging that double-sided printing is performed on the sheet (Step S131; YES), the control section 281 refers to the paper mode information of the job data, and judges what paper type the sheet is (Step S132).

When judging that the paper type of the sheet is plain paper (Step S132; Plain Paper), the control section 281 sets the target fixing temperature of the fixing section 222 at 155° C. (Step S133). When judging that the paper type of the sheet is thick paper (Step S132; Thick Paper), the control section 281 sets the target fixing temperature of the fixing section 222 at 175° C. (Step S134). Thereafter, the control section 281 refers to the paper mode information of the job data to find out if there is another sheet on which printing be performed, thereby judging whether to finish printing or not (Step S135). When judging that the printing is not finished (Step 135; NO), the control section 281 moves to Step S131. When judging that the printing is finished (Step S135; YES), the control section 281 ends the eighth fixing temperature management processing.

When judging that single-sided printing is performed on the sheet (Step S131; NO), the control section 281 refers to the paper mode information of the job data, and judges what paper type the sheet is (Step S136). When judging that the paper type of the sheet is plain paper (Step S136; Plain Paper), the control section 281 sets the target fixing temperature of the fixing section 222 at 160° C. (Step S137), and moves to Step S135. When judging that the paper type of the sheet is thick paper (Step S136; Thick Paper), the control section 281 sets the target fixing temperature of the fixing section 222 at 180° C. (Step S138), and moves to Step S135.

As described above, according to the present embodiment, in the image forming system 1, three values of a temperature (three temperatures) are set for the target fixing temperature of the fixing section 122, and in the case where the tandem outputting is performed, the control section 181 of the first image forming apparatus 100 sets the target fixing temperature of the fixing section 122 at a lower value, as the inside temperature of the second image forming apparatus 200 detected by the temperature detection section 290 becomes higher (the threshold values are 30° C. and 34°), and the control section 281 of the second image forming apparatus 200 sets the target fixing temperature of the fixing section 222 at a value lower than the value of the fiducial temperature FT thereof. Accordingly, the inside temperature of the second image forming apparatus 200 and the temperature of the fixing section 222 can be appropriately managed in accordance with the detected inside temperature of the second image forming apparatus 200, and prevented from going up too much. In addition, when double-sided printing (tandem outputting) is performed, for the sheet which is already heated owing to the printing performed by the first image forming apparatus 100, the target fixing temperature of the second image forming apparatus 200 can be set at a lower value, and the power consumption of the second image forming apparatus 200 can be reduced, accordingly.

Furthermore, the control section 281 of the second image forming apparatus 200 sets the target fixing temperature of the fixing section 222 at a value different in accordance with the paper type (plain paper or thick paper) of a sheet. Accordingly, the inside temperature of the second image forming apparatus 200 and the temperature of the fixing section 222 can be more appropriately managed in accordance with the paper type, and prevented from going up too much.

Eighth Embodiment

Figure 11:
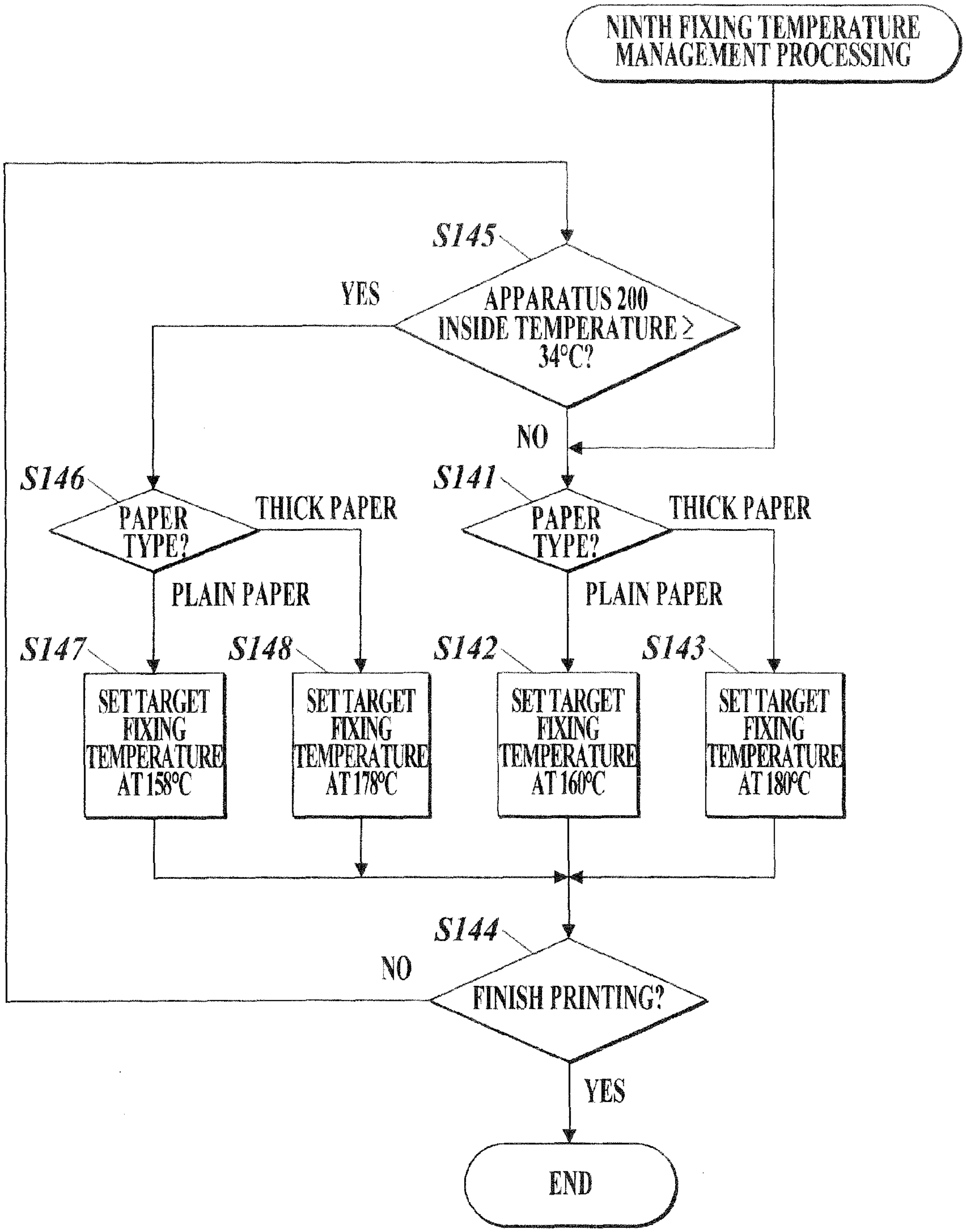
FIG. 11 is a flowchart of ninth fixing temperature management processing performed by the first image forming apparatus.

The eighth embodiment of the present invention is described with reference to FIG. 11. FIG. 11 shows ninth fixing temperature management processing performed by the first image forming apparatus 100.

In the eighth embodiment as well, the image forming system 1 is used. Therefore, in order to avoid repeating the same description, the description of the configurations of the apparatuses of the image forming system 1 is omitted. However, in the embodiment, a ninth fixing temperature management program is stored in the storage section 182 instead of the first fixing temperature management program.

Next, the operations of the image forming system 1 in the embodiment are described with reference to FIG. 11. The ninth fixing temperature management processing performed by the first image forming apparatus 100 is processing to manage the target fixing temperature of the fixing section 122 for when the printing is performed thereby. In the ninth fixing temperature management processing, only double-sided printing is performed. In the ninth fixing temperature management processing, the target fixing temperature (tandem-outputting target fixing temperature) of the fixing section 122 of the first image forming apparatus 100 is managed to be lower than the fiducial temperature FT thereof, and by how many degrees the target fixing temperature of the fixing section 122 is decreased changes in accordance with the inside temperature of the second image forming apparatus 200.

Table 10 shows the target fixing temperatures of the first image forming apparatus 100 and the second image forming apparatus 200 for each paper type for when (double-sided) printing starts (tandem-outputting target fixing temperature) in the ninth fixing temperature management processing.

TABLE 10

| Paper Type | Plain Paper | Thick Paper |
|---|---|---|
| Apparatus 100 | 160° C. | 180° C. |
| Apparatus 200 | 155° C. (FT-5° C.) | 175° C. (FT-5° C.) |

As shown in Table 10, the target fixing temperature of the first image forming apparatus 100 is the same as the fiducial temperature FT thereof for each paper type, and the target fixing temperature of the second image forming apparatus 200 is decreased by 5° C. from the fiducial temperature FT thereof for each paper type.

Table 11 shows the target fixing temperature of the first image forming apparatus 100 for each paper type for when (double-sided) printing is being performed (tandem-outputting target fixing temperature) in the ninth fixing temperature management processing.

TABLE 11

| Paper Type | Plain Paper | Thick Paper |
|---|---|---|
| Apparatus 100 (Apparatus 200 Inside Temperature ≥ 34° C.) | 158° C. (FT-2° C.) | 178° C. (FT-2° C.) |
| Apparatus 100 (Apparatus 200 Inside Temperature < 34° C.) | 160° C. | 180° C. |

As shown in Table 11, when the paper type is plain paper, and the inside temperature of the second image forming apparatus 200 is 34° C. or more, the target fixing temperature of the first image forming apparatus 100 is decreased by 2° C. from the fiducial temperature FT thereof. When the paper type is plain paper, and the inside temperature of the second image forming apparatus 200 is less than 34° C., the target fixing temperature of the first image forming apparatus 100 is the same as the fiducial temperature FT thereof. When the paper type is thick paper, and the inside temperature of the second image forming apparatus 200 is 34° C. or more, the target fixing temperature of the first image forming apparatus 100 is decreased by 2° C. from the fiducial temperature FT thereof. When the paper type is thick paper, and the inside temperature of the second image forming apparatus 200 is less than 34° C., the target fixing temperature of the first image forming apparatus 100 is the same as the fiducial temperature FT thereof.

In the ninth fixing temperature management processing, the target fixing temperature of the second image forming apparatus 200 for when (double-sided) printing is performed is the same as the target fixing temperature thereof shown in FIG. 10 for each paper type.

In the first image forming apparatus 100, for example, input of a job for double-sided printing into the first image forming apparatus 100 triggers the ninth fixing temperature management processing. That is, when such a job is inputted, the control section 181 performs the ninth fixing temperature management processing in accordance with the ninth fixing temperature management program read from the storage section 182 and expanded in the RAM 183.

As shown in FIG. 11, Steps S141, S142, S143, and S144 are the same as Steps S16, S17, S18 and S15 in the first fixing temperature management processing shown in FIG. 3, respectively. When judging that the printing is not finished (Step S144; NO), the control section 181 moves to Step S145. Steps S145 and S146 are the same as Steps S22 and S23 in the second fixing temperature management processing shown in FIG. 4, respectively. When judging that the inside temperature of the second image forming apparatus 200 is less than 34° C. (Step S145; NO), the control section 181 moves to Step S141. When judging that the paper type is plain paper, (Step S146; Plain Paper), the control section 181 sets the target fixing temperature of the fixing section 122 at 158° C. (Step S147), and moves to Step S144. When judging that the paper type is thick paper (Step S146; Thick Paper), the control section 181 sets the target fixing temperature of the fixing section 122 at 178° C. (Step S148), and moves to Step S144.

In response to the start of the ninth fixing temperature management processing, the control section 281 of the second image forming apparatus 200 sets the target fixing temperature of the fixing section 222 at the value of the target fixing temperature thereof shown in Table 10 for each paper type.

As described above, according to the present embodiment, in the image forming system 1 which performs double-sided printing, in the case where the tandem outputting is performed, when the inside temperature of the second image forming apparatus 200 detected by the temperature detection section 290 is a predetermined temperature (34° C.) or more, the control section 181 of the first image forming apparatus 100 sets the target fixing temperature of the fixing section 122 at a value lower than a value thereof for when the inside temperature of the second image forming apparatus 200 is less than the predetermined temperature (34° C.) Therefore, the inside temperature of the second image forming apparatus 200 and the temperature of the fixing section 222 can be appropriately managed in accordance with the detected inside temperature of the second image forming apparatus 200, and prevented from going up too much. In addition, because double-sided printing is performed, for the sheet which is already heated owing to the printing performed by the first image forming apparatus 100, the target fixing temperature of the second image forming apparatus 200 can be set at a lower value, and the power consumption of the second image forming apparatus 200 can be reduced, accordingly.

Furthermore, in the case where the tandem outputting is performed, the control section 181 of the first image forming apparatus 181 sets the target fixing temperature of the fixing section 122 for the first sheet of a job at the value of the fiducial temperature FT thereof. Therefore, in addition to the inside temperature of the second image forming apparatus 200 and the temperature of the fixing section 222 being appropriately managed, and prevented from going up too much, images formed on the first sheet and the rest of the sheets of the job can be prevented from becoming grainy, which is caused at the time of image fixation, and the quality of the images can be increased, accordingly. It is because the target fixing temperature of the fixing section 122 for the first sheet is set at a value higher than values thereof for the other sheets, namely, the target fixing temperature of the fixing section 122 can be set at a lower value after the fixing section 122 is heated.

The above described embodiments are preferred examples of the image forming system of the present invention, and hence the present invention is not limited to the embodiments.

For example, among the configurations described in the above embodiments and below, two or more configurations may be combined when appropriated.

Furthermore, in the embodiments, in the image forming system 1, the first image forming apparatus 100 and the second image forming apparatus 200 are connected in series so as to be integrated. However, this is not a limit. It is possible that two image forming apparatuses are separate apparatuses, and paper paths thereof are connected in series so as to form an image forming system.

Furthermore, in the embodiments, the first image forming apparatus 100 provided on the upstream side in the paper carry direction is a master machine, and the second image forming apparatus 200 provided on the downstream side therein is a slave machine. However, this is not a limit. An image forming apparatus provided on the upstream side in a paper carry direction may be a slave machine, and an image forming apparatus provided on the downstream side therein may be a master machine. Furthermore, an external apparatus may include a control section which controls each of image forming apparatuses of an image forming system.

Furthermore, in the embodiments, the image forming system 1 is constituted of the two image forming apparatuses 100 and 200. However, this is not a limit. An image forming system may be constituted of three or more image forming apparatuses.

Furthermore, in the embodiments, the first image forming apparatus 100 and the second image forming apparatus 200 are directly connected with each other. However, this is not a limit. An image forming system may include an intermediate buffer apparatus disposed between image forming apparatuses.

Furthermore, the detailed configurations and detailed operations of the components of the image forming system 1 in the embodiments can be appropriately modified without departing from the scope of the present invention.

The present U.S. Patent Application claims priority to Japanese Patent Application No. 2010-256368 filed on Nov. 17, 2010 under the Paris Convention for the Protection of Industrial Property, and the Japanese Patent Application is a ground for correction of mistakes in translation of the present U.S. Patent Application when necessary.

What is claimed is:

1. An image forming system comprising:

a first image forming apparatus capable of forming an image on a first side of a sheet and discharging the sheet having the image on the first side thereof, for double-sided printing by a tandem-outputting; and a second image forming apparatus disposed in series at a downstream side of the first image forming apparatus in a sheet transporting direction, the second image forming apparatus being capable of receiving the sheet discharged from the first image forming apparatus which has the first image formed on the first side thereof, and forming a second image on a second side of the received sheet, for the double-sided printing by the tandem-outputting, wherein the first image forming apparatus includes:

a first image forming section which performs image formation on the sheet;

a first fixing section which performs image fixation on the sheet on which the first image forming section performs the image formation; and a first control section which is configured to control the first fixing section to set a tandem-outputting target fixing temperature for the double-sided printing to be lower than a first fiducial temperature serving as a non-tandem-outputting target fixing temperature at which the first image forming apparatus performs the image formation and the image fixation alone.

2. The image forming system according to claim 1, wherein the first control section controls the first fixing section to set the tandem-outputting target fixing temperature to be different in accordance with a type of the sheet.

3. The image forming system according to claim 1, wherein the first control section controls the first fixing section to set, for a first sheet of a job, the tandem-outputting target fixing temperature to be equal to the first fiducial temperature.

4. The image forming system according to claim 1, wherein the second image forming apparatus includes a temperature detection section which detects a temperature inside of the second image forming apparatus, and when the detected temperature inside of the second image forming apparatus is a predetermined temperature or more, the first control section controls the first fixing section to set the tandem-outputting target fixing temperature to be lower than the tandem-outputting target fixing temperature which is set when the detected temperature inside of the second image forming apparatus is less than the predetermined temperature.

5. The image forming system according to claim 4, wherein the first control section controls the first fixing section to set three or more different temperatures as the tandem-outputting target fixing temperature, and to set the tandem-outputting target fixing temperature to be lower as the temperature inside of the second image forming apparatus detected by the temperature detection section becomes higher.

6. The image forming system according to claim 1, wherein the first control section measures a printing duration during which the tandem outputting continues, and when the measured printing duration is a predetermined duration or more, the first control section controls the first fixing section to set the tandem-outputting target fixing temperature to be lower than the tandem-outputting target fixing temperature which is set when the printing duration is less than the predetermined duration.

7. The image forming system according to claim 1, wherein the first control section counts a number of sheets on which the tandem outputting is continuously performed, and when the counted number of sheets is a predetermined number or more, the first control section controls the first fixing section to set the tandem-outputting target fixing temperature to be lower than the tandem-outputting target fixing temperature which is set when the counted number of sheets is less than the predetermined number.

8. The image forming system according to claim 1, wherein the second image forming apparatus includes:

a second image forming section which performs the image formation on a sheet;

a second fixing section which performs the image fixation on the sheet on which the second image forming section performs the image formation; and a second control section, configured to control the second fixing section to set a second tandem-outputting target fixing temperature to be lower than a second fiducial temperature serving as a non-tandem-outputting target fixing temperature at which the second image forming apparatus performs the image formation and the image fixation alone.

9. The image forming system according to claim 8, wherein the second control section controls the second fixing section to set the second tandem-outputting target fixing temperature to be different temperatures in accordance with a type of the sheet.

10. An image forming system comprising:

a first image forming apparatus capable of forming and fixing an image on a first side of a sheet, and thereafter discharging the sheet having the image formed on the first side thereof, for double-sided printing by a tandem-outputting; and a second image forming apparatus disposed in series at a downstream side of the first image forming apparatus in a sheet transporting direction and capable of receiving the sheet having the first image formed on the first side thereof which is discharged from the first image forming apparatus and forming a second image on a second side of the received sheet, for the double-sided printing by the tandem-outputting; and a control section configured to set a tandem-outputting target fixing temperature in the first image forming apparatus for the double-sided printing to be lower than a fiducial temperature serving as a non-tandem-outputting target fixing temperature in the first image forming apparatus at which the first image forming apparatus performs an image formation and an image fixation alone.

11. The image forming system according to claim 10, wherein the control section sets the tandem-outputting target fixing temperature to be different in accordance with a type of the sheet.

12. The image forming system according to claim 10, wherein the control section sets the tandem-outputting target fixing temperature in the first image forming apparatus to be equal to the fiducial temperature for the image fixation on a first sheet of a job.

13. The image forming system as claimed in claim 10, wherein the second image forming apparatus includes a temperature detection section which detects a temperature inside of the second image forming apparatus, and when the detected temperature inside of the second image forming apparatus is a predetermined temperature or more, the control section sets the tandem-outputting target fixing temperature in the first image forming apparatus to be lower than the tandem-outputting target fixing temperature which is set when the detected temperature inside of the second image forming apparatus is less than the predetermined temperature.

14. The image forming system as claimed in claim 13, wherein the control section is capable of setting three or more different temperatures as the tandem-outputting target fixing temperature in the first image forming apparatus, and the control section sets the tandem-outputting target fixing temperature lower as the temperature inside of the second image forming apparatus detected by the temperature detection section becomes higher.

15. The image forming system as claimed in claim 10, wherein the control section measures a printing duration during which the tandem outputting continues, and when the measured printing duration is a predetermined duration or more, the control section sets the tandem-outputting target fixing temperature in the first fixing section to be lower than the tandem-outputting target fixing temperature which is set when the printing duration is less than the predetermined duration.

16. The image forming system as claimed in claim 10, wherein the control section counts a number of sheets on which the tandem outputting is continuously performed, and when the counted number of sheets is a predetermined number or more, the control section sets the tandem-outputting target fixing temperature in the first image forming apparatus to be lower than the tandem-outputting target fixing temperature which is set when the counted number of sheets is less than the predetermined number.

17. The image forming system as claimed in claim 10, wherein the control section sets a second tandem-outputting target fixing temperature in the second image forming apparatus to be lower than a second fiducial temperature serving as a non-tandem-outputting target fixing temperature in the second image forming apparatus at which the second image forming apparatus performs the image formation and the image fixation alone.

18. The image forming system as claimed in claim 17, wherein the control section sets the second tandem-outputting target fixing temperature to be different temperatures in accordance with a type of the sheet.

* * * * *